US012553287B2

(12) United States Patent
Ford et al.

(10) Patent No.: US 12,553,287 B2
(45) Date of Patent: Feb. 17, 2026

(54) PRODUCTION WELLBORE DEFLECTOR-LESS MULTILATERAL SYSTEM USING A GUIDANCE SUB

(71) Applicant: Halliburton Energy Services, Inc., Houston, TX (US)

(72) Inventors: Jacob Dale Ford, Carrollton, TX (US); Lars Petter Larsen, Stavanger (NO); Joakim Molven, Stavanger (NO)

(73) Assignee: Halliburton Energy Services, Inc., Houston, TX (US)

( * ) Notice: Subject to any disclaimer, the term of this patent is extended or adjusted under 35 U.S.C. 154(b) by 63 days.

(21) Appl. No.: 18/625,533

(22) Filed: Apr. 3, 2024

(65) Prior Publication Data

US 2025/0084705 A1 Mar. 13, 2025

Related U.S. Application Data

(60) Provisional application No. 63/581,892, filed on Sep. 11, 2023.

(51) Int. Cl.
*E21B 7/04* (2006.01)
*E21B 23/00* (2006.01)
(Continued)

(52) U.S. Cl.
CPC ................ *E21B 7/04* (2013.01); *E21B 23/00* (2013.01); *E21B 41/00* (2013.01); *E21D 9/00* (2013.01); *F16L 1/028* (2013.01)

(58) Field of Classification Search
CPC . E21B 7/04; E21B 41/00; E21B 23/00; E21D 9/005; F16L 1/028
See application file for complete search history.

(56) References Cited

U.S. PATENT DOCUMENTS 3,526,280 A 9/1970 Aulick
5,415,138 A * 5/1995 Hudson .................. F01L 1/146 123/90.43

(Continued)

FOREIGN PATENT DOCUMENTS

WO WO-2004099556 A1 * 11/2004 ............... E21B 7/28
WO 2023158432 8/2023

OTHER PUBLICATIONS

"PCT Application No. PCT/US2024/022905 International Search Report and Written Opinion", Jul. 22, 2024, 10 pages.

(Continued)

*Primary Examiner* — Jong-Suk (James) Lee
(74) *Attorney, Agent, or Firm* — DeLizio, Peacock, Lewin & Guerra LLP

(57) ABSTRACT

An apparatus comprises a guidance sub to be attached to a tubular string for conveyance of the tubular string in a multilateral wellbore. The guidance sub comprises an articulating buoyancy structure that comprises multiple buoyancy links comprised of a buoyant material such that the articulating buoyancy structure is to have a buoyancy within a well fluid that is downhole in a primary wellbore, wherein the multiple buoyancy links are coupled together such that joints are formed between the multiple buoyancy links to allow movement between adjacent buoyancy links of the multiple buoyancy links, wherein the articulating buoyance structure is configured to direct guidance sub out of a multilateral window from a main bore and into a lateral bore of the multilateral wellbore.

23 Claims, 24 Drawing Sheets

(51) Int. Cl.

| | |
|---|---|
| ***E21B 41/00*** | (2006.01) |
| ***E21D 9/00*** | (2006.01) |
| *F16L 1/028* | (2006.01) |

(56) References Cited

U.S. PATENT DOCUMENTS

| | | | | |
|---|---|---|---|---|
| 7,228,918 | B2 * | 6/2007 | Evans | E21B 7/28 175/73 |
| 10,316,626 | B2 * | 6/2019 | Keshishian | E21B 43/10 |
| 11,846,148 | B2 * | 12/2023 | Al Dossary | E21B 23/14 |
| 2003/0192699 | A1 | 10/2003 | Gano | |
| 2010/0284750 | A1 * | 11/2010 | Begley | E21B 17/012 405/224.2 |
| 2012/0061141 | A1 | 3/2012 | Rossing | |
| 2012/0261130 | A1 | 10/2012 | Linn et al. | |
| 2014/0116728 | A1 | 5/2014 | Zhou | |
| 2014/0202699 | A1 * | 7/2014 | Loving | E21B 43/086 166/99 |
| 2015/0107843 | A1 | 4/2015 | Talley et al. | |
| 2016/0084013 | A1 * | 3/2016 | Hradecky | E21B 41/00 166/380 |
| 2016/0333658 | A1 | 11/2016 | Keshishian et al. | |
| 2017/0260834 | A1 | 9/2017 | Chacon et al. | |
| 2018/0080308 | A1 | 3/2018 | Dedman et al. | |
| 2019/0169954 | A1 | 6/2019 | Cabot et al. | |
| 2019/0234163 | A1 | 8/2019 | Glaser et al. | |
| 2019/0352994 | A1 | 11/2019 | Giroux | |
| 2020/0340308 | A1 | 10/2020 | Mccormick | |
| 2020/0392803 | A1 * | 12/2020 | Zhao | E21B 23/00 |
| 2022/0275709 | A1 * | 9/2022 | Glaser | E21B 23/10 |
| 2022/0333458 | A1 * | 10/2022 | Laun | E21B 23/00 |
| 2022/0412192 | A1 | 12/2022 | Glaser et al. | |
| 2023/0258048 | A1 * | 8/2023 | Falnes | E21B 23/12 |
| 2024/0287861 | A1 * | 8/2024 | Falnes | E21B 7/061 |

OTHER PUBLICATIONS

"PCT Application No. PCT/US2022/016956 International Search Report and Written Opinion", Nov. 3, 2022, 9 pages.

"U.S. Appl. No. 17/674,418 Office Action", Jul. 19, 2023, 12 pages.

* cited by examiner

PRODUCTION WELLBORE DEFLECTOR-LESS MULTILATERAL SYSTEM USING A GUIDANCE SUB

BACKGROUND

A multilateral well is a well formed with one or more secondary wellbores that branch off another primary wellbore. To construct a multilateral well, a primary wellbore is drilled, and a casing joint is installed at the desired junction location. A deflector is then positioned at the desired junction location along the primary wellbore and anchored in place. A whipstock may be used to guide the milling of a window. The whipstock may then be later recovered and replaced by a completion deflector for junction completion. The lateral bore and main bore branch may be connected by stinging in/out with a guidance sub past the exit area into the lateral branch to comingle with main bore branch through junction. The result is a multilateral junction where the two wellbores intersect. The multilateral junction can be reinforced, and the secondary wellbore may be completed for production of hydrocarbons through the secondary wellbore.

BRIEF DESCRIPTION OF THE DRAWINGS

Embodiments of the disclosure may be better understood by referencing the accompanying drawings.

DESCRIPTION

Figure 1:
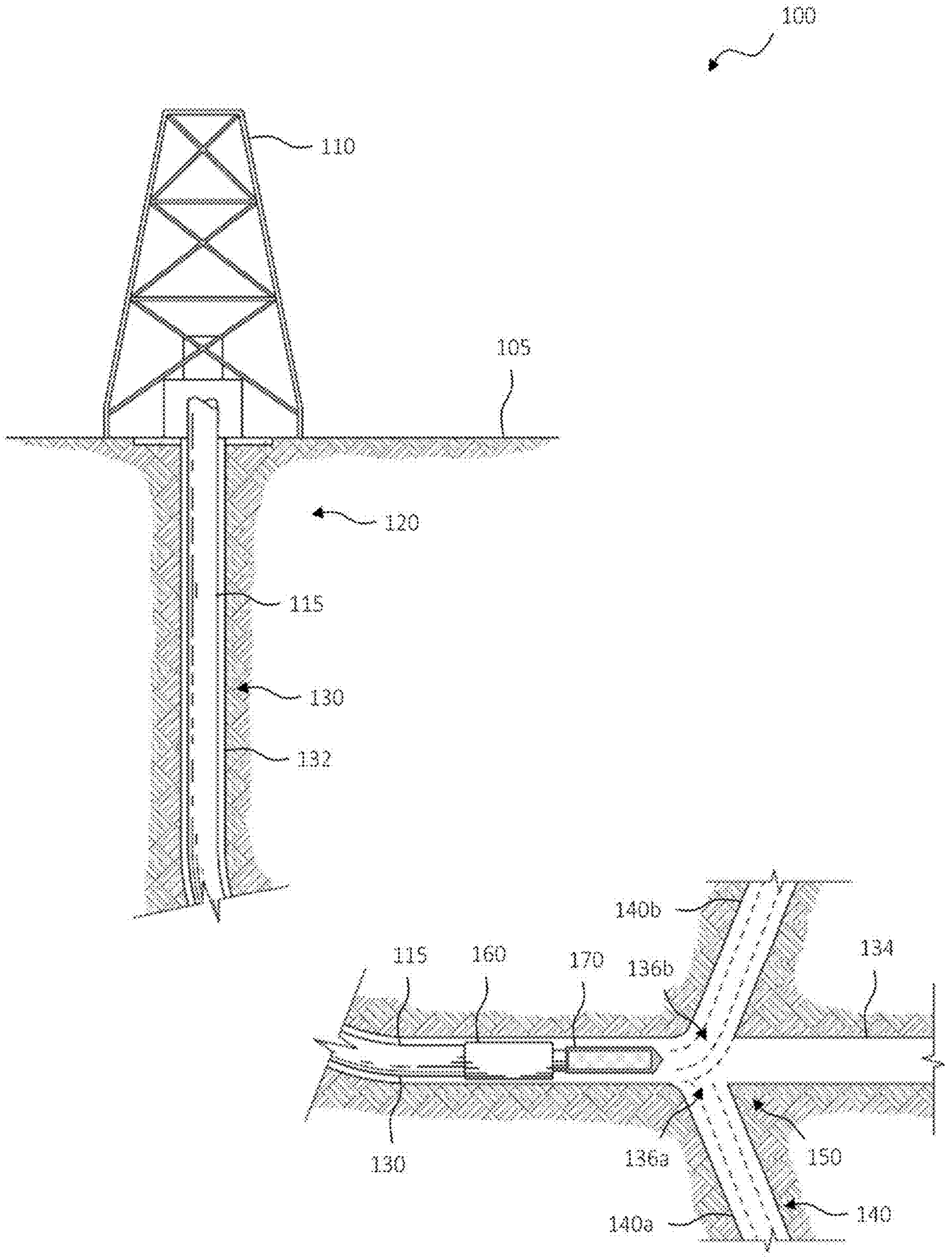
FIG. 1 is an elevation view of an example well system, according to some embodiments.

The description that follows includes example systems, methods, techniques, and program flows that embody aspects of the disclosure. However, it is understood that this disclosure may be practiced without these specific details. In some instances, well-known instruction instances, protocols, structures, and techniques have not been shown in detail in order not to obfuscate the description.

In traditional multilateral wells, once a lateral bore has been created, a deflector tool may be run and anchored below the multilateral window. This is done in order to mechanically direct tools such as lateral completion strings out the milled window into the lateral bore. The problem is that running this deflector tool adds an extra trip to the overall multilateral portion of a job. Every additional trip added to a multilateral completion operation means additional money required to complete that well.

Example implementations (as described herein) may provide a way for the lateral completion string to be run without need of a deflector tool, thereby eliminating an extra trip and shortening the overall time to complete a multilateral well. Some implementations may remove the need for a deflector tool by running a guidance sub at the end of the lateral completion string. Such a guidance sub may direct the lateral completion string out the multilateral window into the lateral bore without the need of a deflector. For example, some implementations may include a tool that provides the deflector-free guidance via articulating buoyant materials. These articulating buoyant materials may provide the lift necessary to carry the lateral string out the window (and not having the lateral string continue down the main wellbore).

The majority of multilateral wells feature "high side" exits, in which the milled opening in the casing is typically within +/−30 degrees vertically upwards. In these situations, because the buoyant guide subs are able to articulate, the buoyant guide subs can find the window opening while rising and direct the end of the lateral string out the window.

In situations wherein the lateral well is entered via a "low side" exit from the main bore (wherein the milled casing opening may be positioned approximately vertical downwards), the guidance sub may still be used by guiding the lateral string over the casing opening without the tool string falling down into the opening. In some implementations, the deflection/lift needed may be provided via mechanical spring assistance instead of or in addition to buoyancy.

When enough of the string has gone into the lateral bore, the rest of the lateral string will be mechanically directed behind into the secondary wellbore as well. At this point, the well may be completed the same as any other multilateral well, with seals run behind or in tandem with the guidance sub sealing inside the lateral bore (providing a flow path back to surface). Accordingly, because a deflector was not run as part of this installation, a trip is eliminated from the job.

Thus, example implementations may include articulating buoyant links at the end of the lateral string. This is in contrast to conventional approaches that are limited to a buoyant sub as a single piece (run at the end of a tubing string). Such conventional approaches are reliant on the buoyancy of the guidance sub to lift the rest of the tubing behind the sub into the lateral bore. Example implementations may, thus, include articulating buoyant links that may lift only themselves and acting as a guide for the rest of the lateral string following these links out from the window. In contrast to example implementations, conventional approaches also do not provide a secondary way to keep the buoyant guide sub-materials fixed on the lateral tubing string in case of breakage or separation. Example implementations may provide a method to keep the buoyant links fixed to the lateral string, even in the case of separation (as further described below). Example implementations, thus, may remove a trip downhole as part of the creation of multilateral wells. Accordingly, the overall cost and time needed for the creation of a multilateral well is reduced.

Example System

FIG. 1 is an elevation view of an example well system, according to some embodiments. In FIG. 1, a well system 100 includes a large support structure generally referred to as a rig 110 may be used for suspending and lowering an oilfield conveyance 115 into a multilateral well 120. For example, a guidance sub 170 may be used to guide an oilfield conveyance 115 into a different leg of the multilateral well 120. As further described below, in some implementations, the guidance sub 170 may be an articulating buoyant guidance sub, a guidance sub having a buoyancy joint, a guidance sub having a collapsible leaf spring, etc. for guiding the oilfield conveyance 115.

Although the rig 110 is depicted as being land-based, the disclosed principles could be applied in a multilateral well at any other well site, such as an offshore or floating platform. The oilfield conveyance 115 may be assembled from individual tubing segments and tools as it is progressively lowered into the multilateral well 120, in which case equipment would be included for helping to make up and break out those connections. The rig 110 may alternatively support coiled tubing operations that use a long, continuous supply of tubing rather than assembling and disassembling the oilfield conveyance 115 from discrete segments, or alternatively even wireline, slickline, etc. Various other equipment known in the art is provided at the well system 100 for supporting well operations such as the delivery or return of fluids, power, and electrical communication downhole.

The multilateral well 120 includes a primary wellbore 130 drilled from a surface 105 of the well system 100 and at least one secondary wellbore 140 (e.g., low-side secondary wellbore **140*a* and high-side secondary wellbore 140*b* in the illustrated embodiment) branching off the primary wellbore 130, which together form a multilateral junction 150 in the drilled formation. The term "primary wellbore" is broadly used herein to refer to any wellbore intersected by another wellbore (the lateral or "secondary wellbore"). In this example, the primary wellbore 130 is the main wellbore of this multilateral junction 150 and the secondary wellbore(s) 140*a*, 140*b* are the lateral wellbore(s) of the multilateral junction 150**. However, the disclosed principles are applicable to any multilateral junction, and is not limited to those involving the primary wellbore drilled from surface.

The primary wellbore 130 may follow a given wellbore path. In the FIG. 1 example, the first portion of the primary wellbore 130 is a long, vertical section 132 drilled from a surface 105 of the well system 100. Directional drilling techniques are then used to deviate away from vertical to form a horizontal section 134, which is also part of the primary wellbore 130. A window (opening, junction, exit, lateral exit, etc.) is then formed (milled, created, etc.) in the horizontal section 134 of the primary wellbore 130, and the secondary wellbore 140 may then be drilled. In the illustrated embodiment of FIG. 1, the secondary wellbore **140*a* is drilled at a low-side exit 136*a* from the horizontal section 134 of the primary wellbore 130, and the secondary wellbore 140*b* is drilled at a high-side exit 136*b* from the horizontal section 134 of the primary wellbore 130**.

For ease of illustration, the low-side exit **136*a* is drawn facing vertically downward, the horizontal section 134 is drawn at ninety degrees to the surface (perpendicular to gravitational force), and the high-side exit 136*b*** is drawn facing vertically upward. However, the low-side exit may be any exit to a secondary wellbore along a non-vertical primary wellbore such that the ordinary mass of heavy tubing might cause an oilfield conveyance to veer out the low-side exit into the secondary wellbore, and the high side exit may any exit to a secondary wellbore along a non-vertical primary wellbore such that the ordinary mass of heavy tubing might cause an oilfield conveyance to stay within the primary wellbore and not veer out the high-side exit into the secondary wellbore.

Having drilled the multilateral well 120 in the formation, portions of the wellbore may be completed by tripping tubular componentry downhole and installing it on the oilfield conveyance 115. For example, the oilfield conveyance 115 is shown in FIG. 1 being lowered into the primary wellbore 130 from the surface 105 down to the horizontal section 134 of the primary wellbore 130, with a tubular component 160 carried on the oilfield conveyance 115. The oilfield conveyance 115 and tubular component 160 may comprise tubing of heavy steel or other metallic materials.

The guidance sub 170 may be positioned at a leading end of the oilfield conveyance 115, ahead of the tubular component 160. In some implementations, the guidance sub 170 may be articulating and buoyant (capable of floating in a well fluid). The articulation and buoyancy of the guidance sub 170 may urge the guidance sub 170 to a high side, whether that be to a high side of the primary wellbore 130 above the low-side exit 136*a*, or a high side of the high-side exit 136*b* above the primary wellbore 130. The guidance sub 170 may be used, as further discussed below, to help guide the tubular component 160 or the oilfield conveyance 115 to the high-side and across the multilateral junction 150, whether a low-side exit 136*a* exists and the guidance sub 170 keeps the tubular component 160 or the oilfield conveyance 115 in a downhole portion of the primary wellbore 130, or a high-side exit 136*b* exists and the guidance sub 170 keeps the tubular component 160 or the oilfield conveyance 115 in a downhole portion of the secondary wellbore 140*b*.

Example implementations may be useful in both installing the completions and later servicing the well upon completion. The oilfield conveyance 115 may be a completions string or a work string for installing or servicing the well, among others. The tubular component 160 carried on the oilfield conveyance 115 may include tubular members for lining and reinforcing the primary wellbore 130 and/or secondary wellbore(s) 140*a*, 140*b*.

Example Guidance Subs

Figure 2:
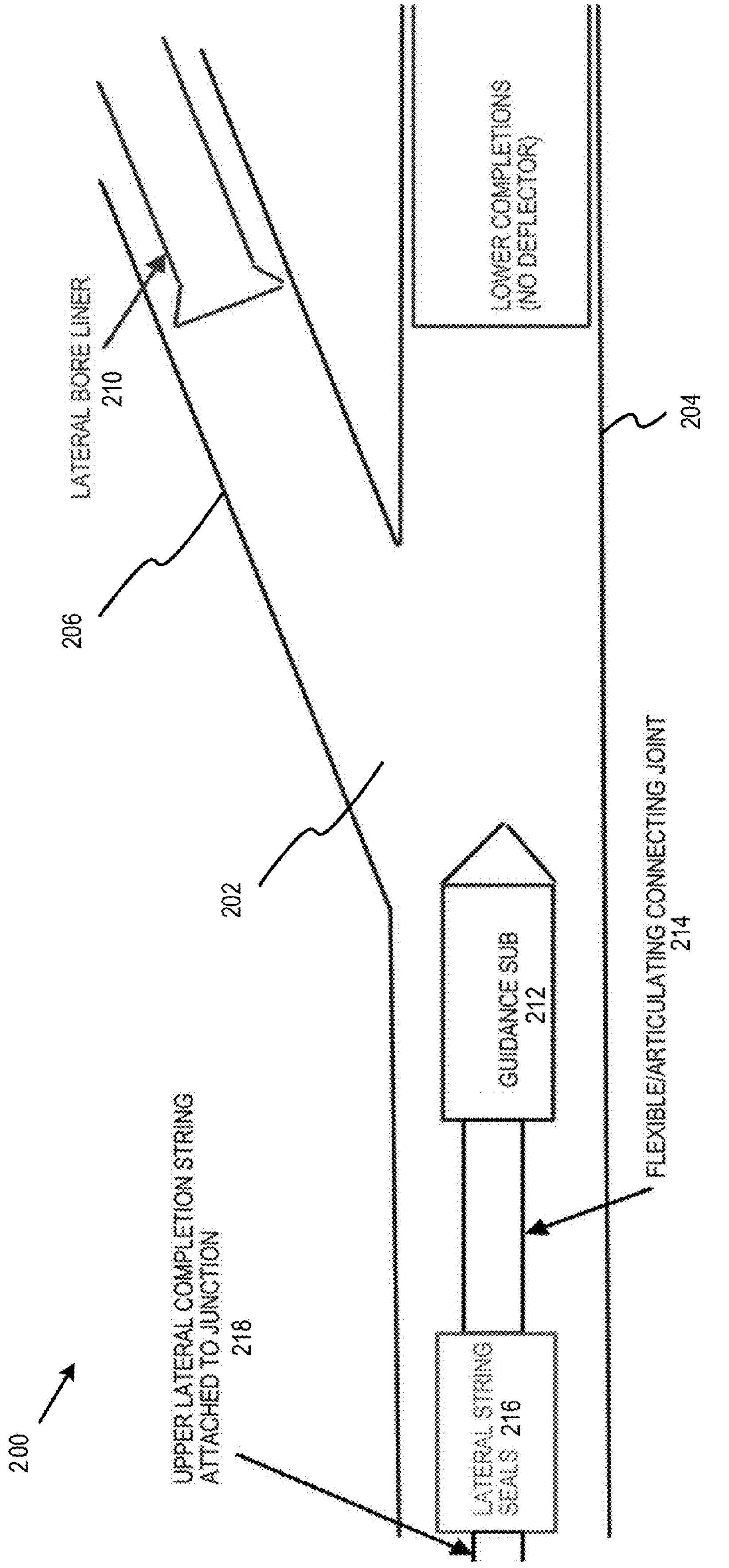
FIG. 2 is a schematic side view of an example articulating guidance sub coupled to a lateral string and positioned in a multi-lateral well/lateral exit, according to some embodiments.

FIG. 2 is a schematic side view of an example articulating guidance sub coupled to a lateral string and positioned in a multi-lateral well/lateral exit, according to some embodiments. FIG. 2 depicts a multi-lateral well having a multi-lateral window 202 that has been milled off a primary wellbore 204 to form a secondary wellbore 206. In FIG. 2, a system 200 includes a lateral bore liner 210 that has been run into the secondary wellbore 206. The system 200 also includes a guidance sub 212 coupled to a flexible/articulating connecting joint 214, coupled to lateral string seals 216, and coupled to an upper lateral string completion string (attached to junction) 218. As further described below, the guidance sub 212 may guide these different components coupled together through the multi-lateral window 202 and into the secondary wellbore 206 without a deflector tool.

Example Articulating Buoyant Guidance Subs

Figure 3:
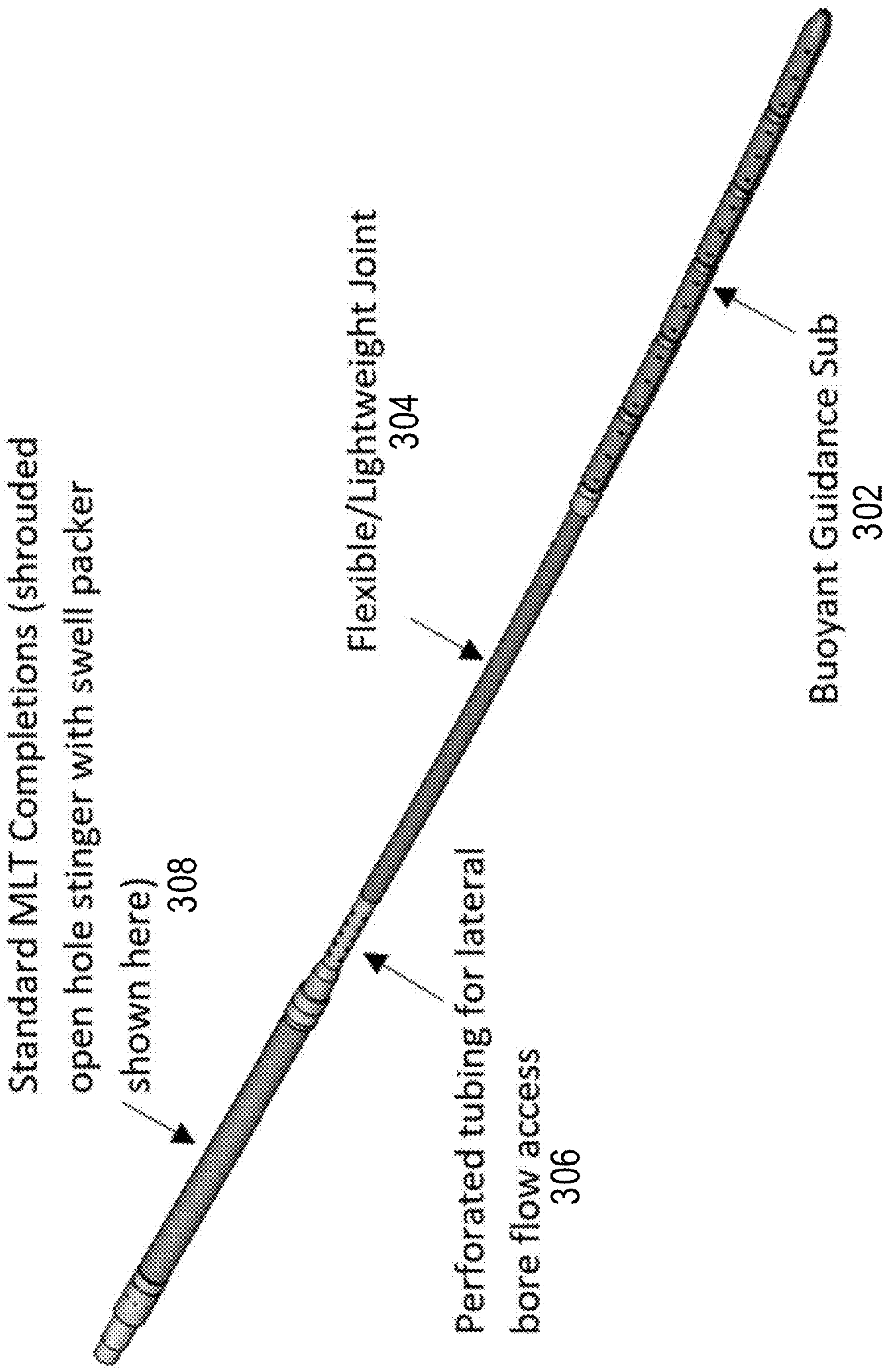
FIG. 3 is a perspective view of an articulating buoyant guide sub, according to some embodiments.

FIG. 3 is a perspective view of an articulating buoyant guidance sub, according to some embodiments. In particular, FIG. 3 depicts an example of an articulating buoyant guidance sub 302 that may provide guidance into the lateral bore via an articulating buoy string run at the end of a lateral bore completion. The articulating buoyant guidance sub 302 is coupled to a perforated tubing 306 via a flexible/lightweight joint 304. Standard multilateral technology (MLT) completions 308 is coupled to the perforated tubing 306. The completions 308 may comprise a set of seals with a surrounding shroud around the set of seals.

Figure 4:
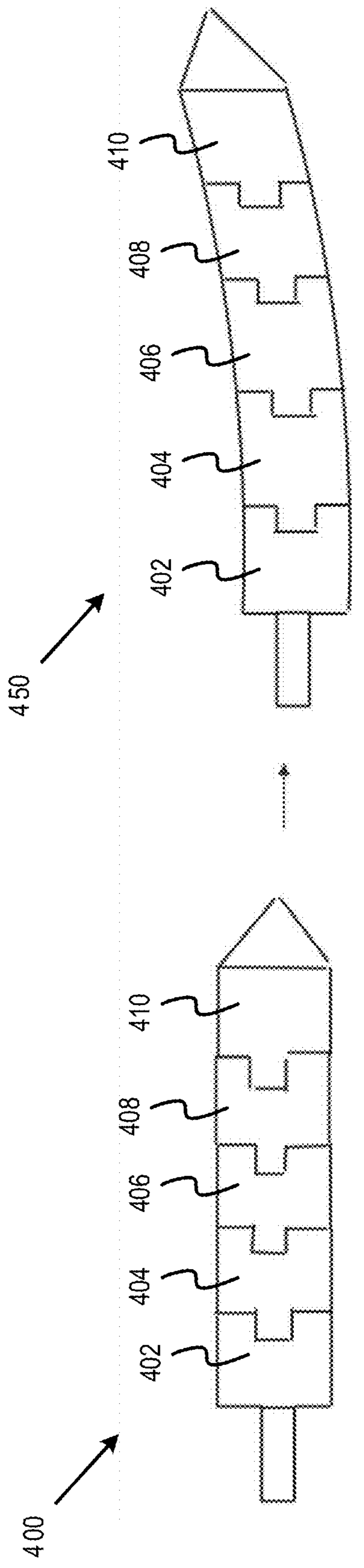
FIG. 4 is a schematic side view of example articulating buoyant guide sub, according to some embodiments.

FIG. 4 is a schematic side view of example articulating buoyant sub, according to some embodiments. FIG. 4 depicts an example articulating buoyant guidance sub that includes example articulating buoys (in an unarticulated position) 400 and the example articulating buoys (in an articulated position) 450. The example articulating buoys 400 and 450 include a number of articulating buoy links 402, 404, 406, 408, and 410 that are coupled together.

Figure 5A:
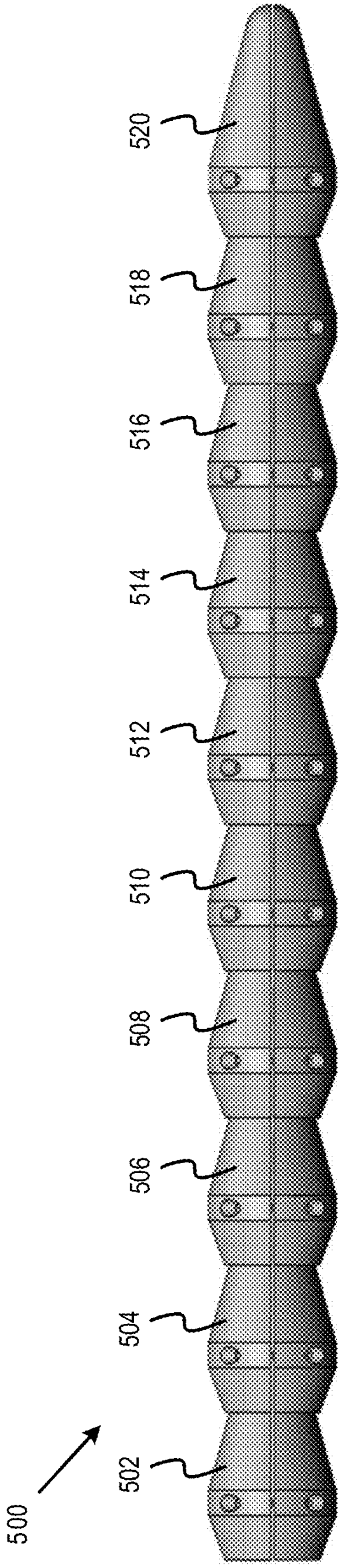
FIGS. 5A-5B are schematic side views of an example articulating buoyant sub in an unarticulated position and an articulated position, respectively, according to some embodiments.
Figure 5B:
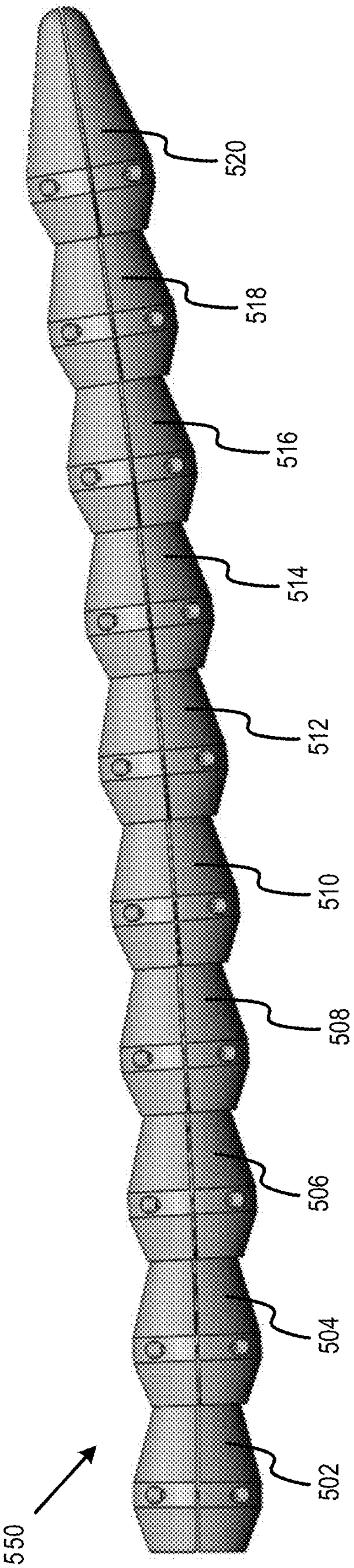

FIGS. 5A-5B are schematic side views of an example articulating buoyant sub in an unarticulated position and an articulated position, respectively, according to some embodiments. FIG. 5A depicts an example articulating buoyant guidance sub 500 that includes example articulating buoys (in an unarticulated position). FIG. 5B depicts an example articulating buoyant sub 550 that includes example articulating buoys (in an articulated position). The example articulating buoyancy guidance subs 500 and 550 include a number of articulating buoy links 502, 504, 506, 508, 510, 512, 514, 516, 518, and 520 that are coupled together. As shown in FIGS. 4 and 5A-5B, the articulating buoyant subs may be a buoy string that may include multiple buoyant material links, which may be chained or coupled together and may articulate due to articulating joints (such as ball pivots) in each link of the chain.

Figure 6A:
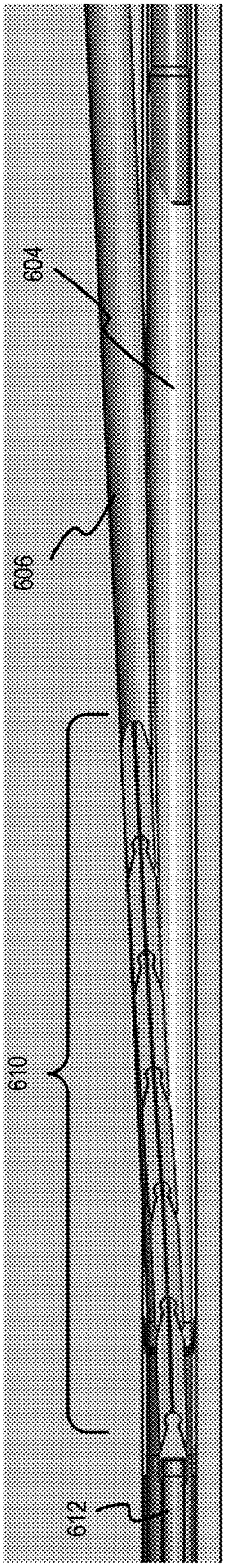
FIGS. 6A-6C are schematic side views of an example articulating buoyant sub and trailing flexible joint (that is to guide a tubing string) exiting the window and entering the secondary wellbore at three different points in time, according to some embodiments.
Figure 6B:
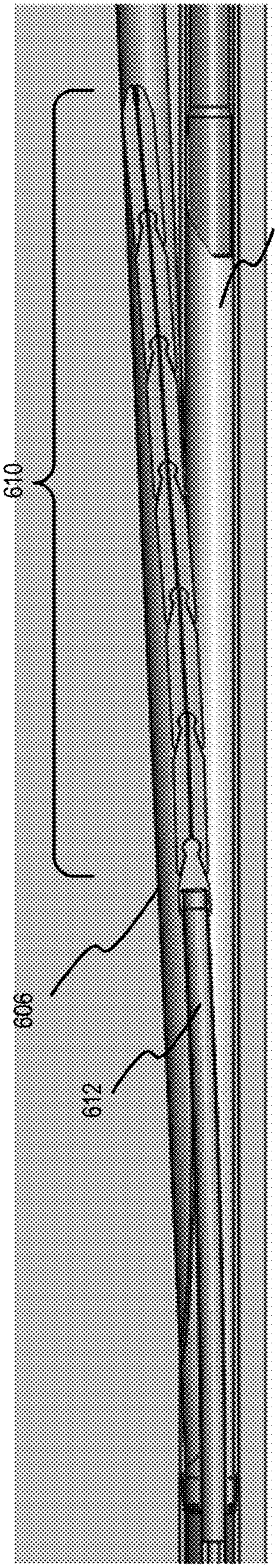
Figure 6C:
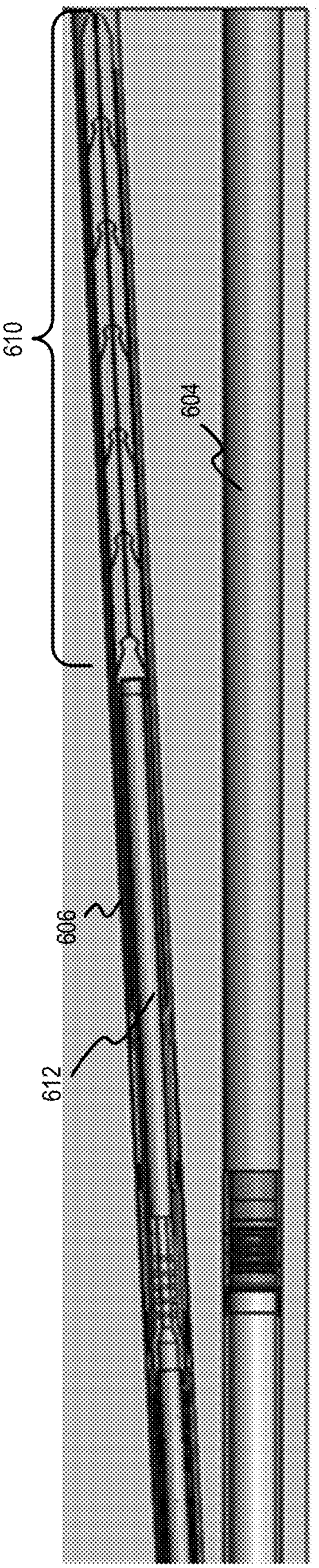

FIGS. 6A-6C are schematic side views of an example articulating buoyant sub and trailing flexible joint (that is to guide a tubing string) exiting the window and entering the secondary wellbore at three different points in time, according to some embodiments. FIGS. 6A-6C depict an articulating buoyant sub 610 having multiple buoyant links coupled together. A flexible joint 612 is coupled behind the articulating buoyant sub 610. A tubing string (not shown) is coupled behind the flexible joint 612. FIG. 6A depicts the articulating buoyant sub 610 entering a window from a primary wellbore 604 into a secondary wellbore 606 (at a first point in time). FIG. 6B depicts the articulating buoyant sub 610 entering the window (at a second later point in time) from the primary wellbore 604 into the secondary wellbore 606. FIG. 6C depicts the articulating buoyant sub 610 after completing entering the window and being positioned in the secondary wellbore 606 (at a third point in time).

As this string (in this case, run as part of the lateral leg of the multilateral junction) enters into the window, the articulating buoyant sub 610 begins to articulate upwards, exiting out the window and into the secondary wellbore 606. As shown in FIG. 6B, as the tools move further down, the buoys eventually enter into the secondary wellbore 606. With enough of the buoys already in the secondary wellbore 606, these buoys may direct the lightweight/flexible joint 612 behind the buoys, along with the rest of the lateral string, into the lateral liner in the secondary wellbore 606.

Figure 7:
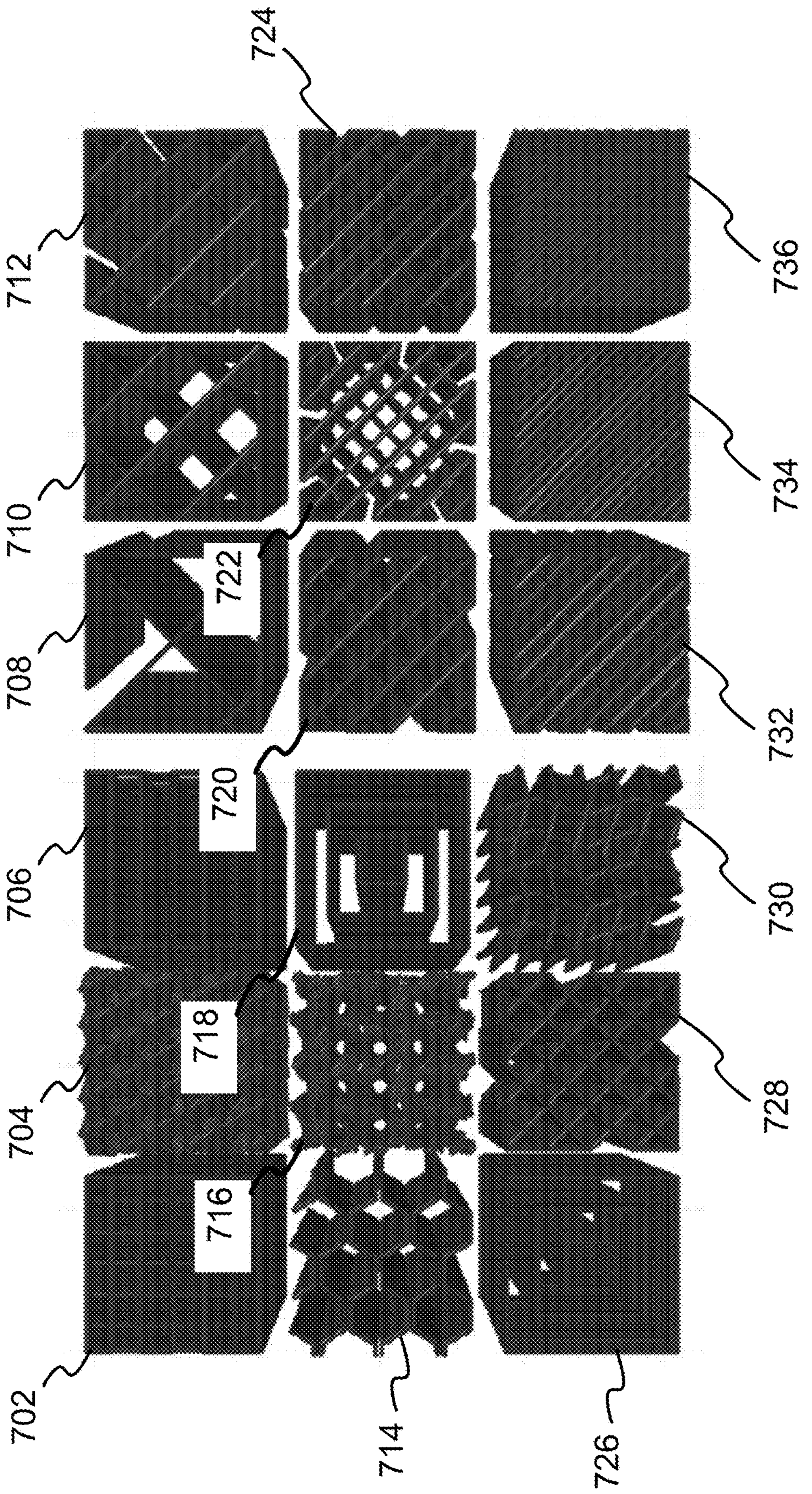
FIG. 7 are examples of three-dimensional (3D) printing latticework for buoyant materials, according to some embodiments.

Example implementations may include an articulating guidance sub that includes links that may include materials with buoyant properties in order to float upwards out the casing window. FIG. 7 are examples of three-dimensional (3D) printing latticework for buoyant materials, according to some embodiments. FIG. 7 includes a 3D printing latticework 702, a 3D printing latticework 704, a 3D printing latticework 706, a 3D printing latticework 708, a 3D printing latticework 710, a 3D printing latticework 712, a 3D printing latticework 714, a 3D printing latticework 716, a 3D printing latticework 718, a 3D printing latticework 720, a 3D printing latticework 722, a 3D printing latticework 724, a 3D printing latticework 726, a 3D printing latticework 728, a 3D printing latticework 730, a 3D printing latticework 732, a 3D printing latticework 734, and a 3D printing latticework 736. These example buoyant materials may make the most of the body of the link air, giving it buoyant properties in denser fluids.

Another material option for these links may be syntactic foam subs, which have exceptional buoyant properties while still maintaining high pressure requirements. Syntactic foams materials are composites that may include hollow spheres with a metal, polymer or ceramic filler, which gives them a mixture of strength and buoyancy.

Figure 8:
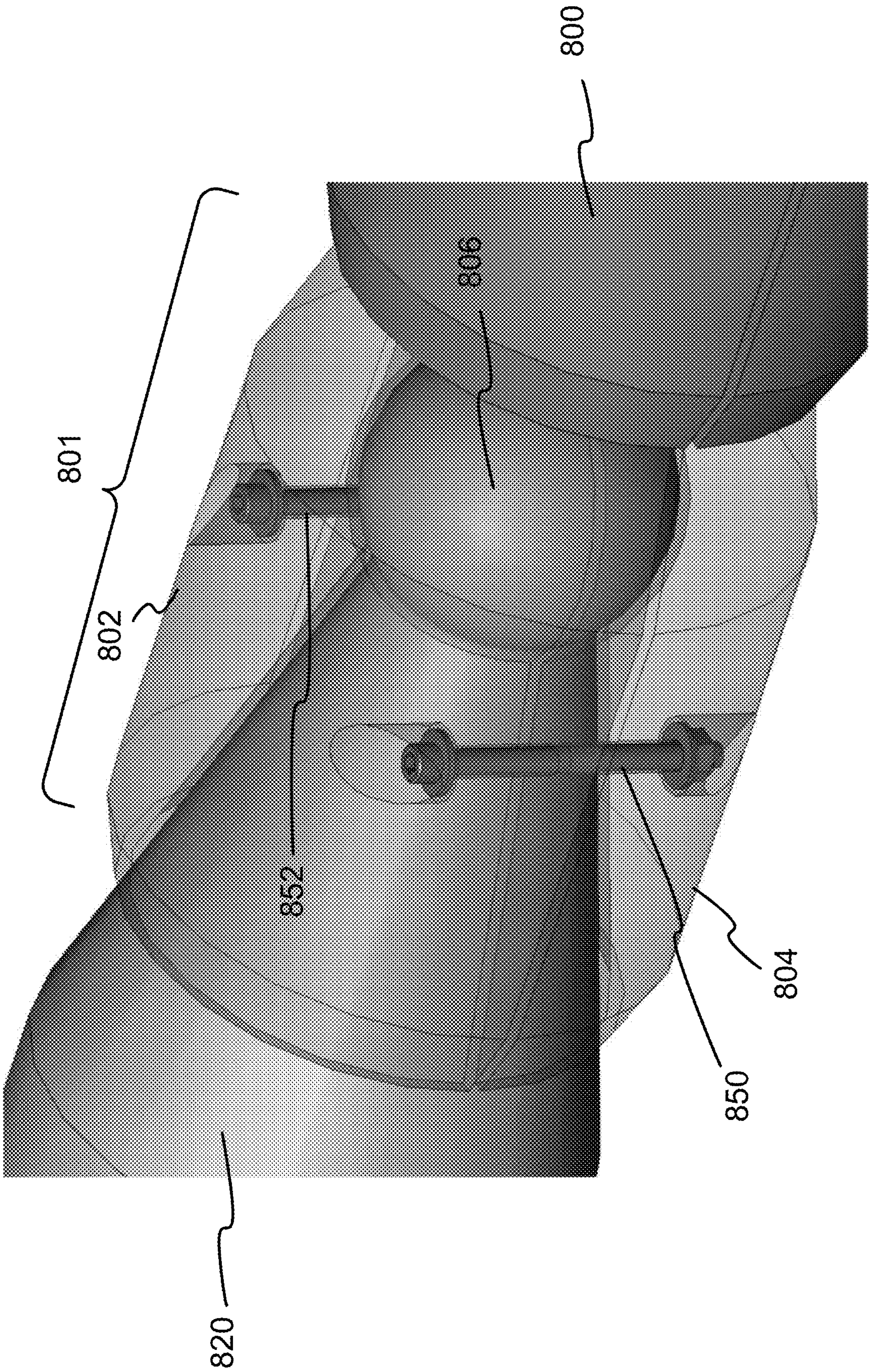
FIG. 8 is a perspective view of example buoyant half pieces held together by fasteners, according to some embodiments.

Example implementations may include a means by which these articulating links are connected. There may be several options to achieve these connections. FIG. 8 is a perspective view of example buoyant half pieces held together by fasteners, according to some embodiments. In this example of FIG. 8, an articulating link 800 that includes an end 801 that may include two halves (a half 802 and a half 804). The half 802 and the half 804 may be placed together over a ball joint 806 of a previous articulating link 820, which holds them together. Additionally, the halves 802-804 may be held together via fasteners or adhesive medium or compound between the pieces, or both. In this example, the halves 802-804 may be held together via fasteners 850 and 852.

In some implementations, the articulating links may be connected such that a link is one whole piece instead of two halves, as above, Instead, a collet feature may be added to each link. The links may then be snapped together.

Figure 9B:
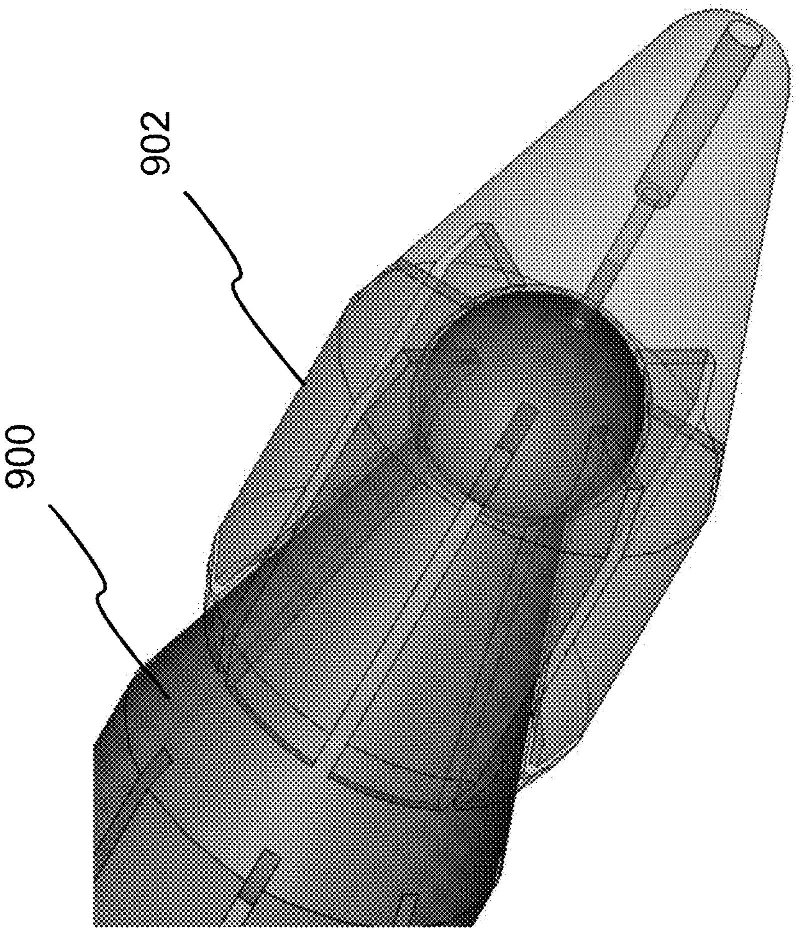
FIGS. 9A-9B are perspective views of an example external collet linking for buoyant pieces, according to some embodiments.
Figure 9A:
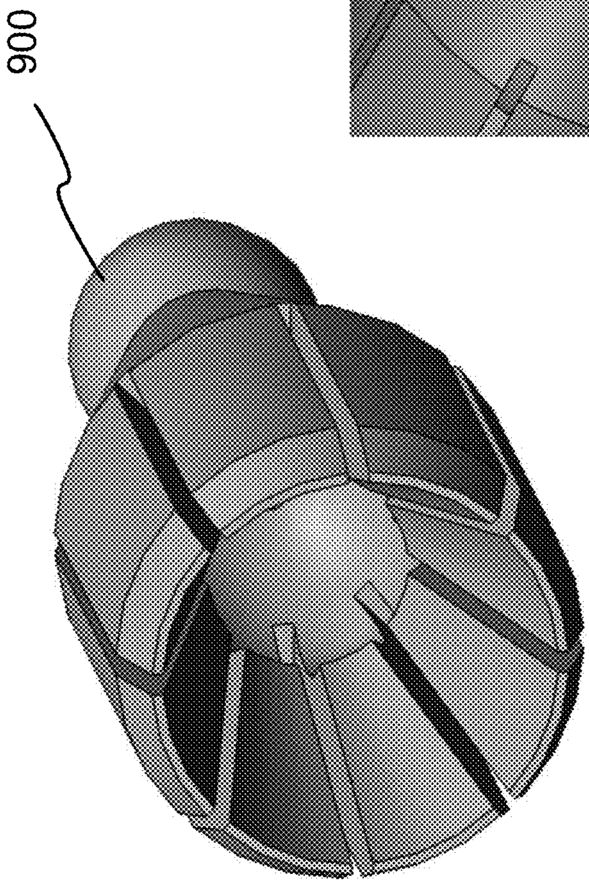

For example, FIGS. 9A-9B are perspective views of an example external collet linking for buoyant pieces, according to some embodiments. As shown in FIGS. 9A-9B, these collets may be external and may be clamped over a ball joint on each link. FIGS. 9A-9B depict a collet 900. FIG. 9B depicts the collet 900 that is clamped over by a ball joint 902.

Figure 10B:
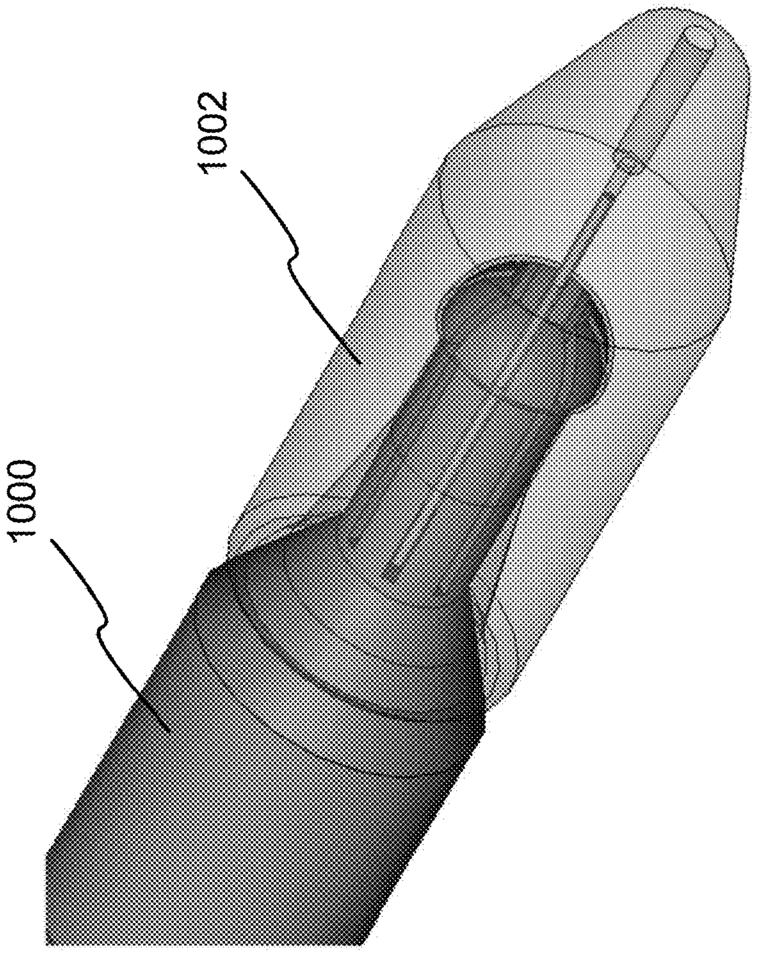
FIGS. 10A-10B are perspective views of an example internal collet linking for buoyant pieces, according to some embodiments.
Figure 10A:
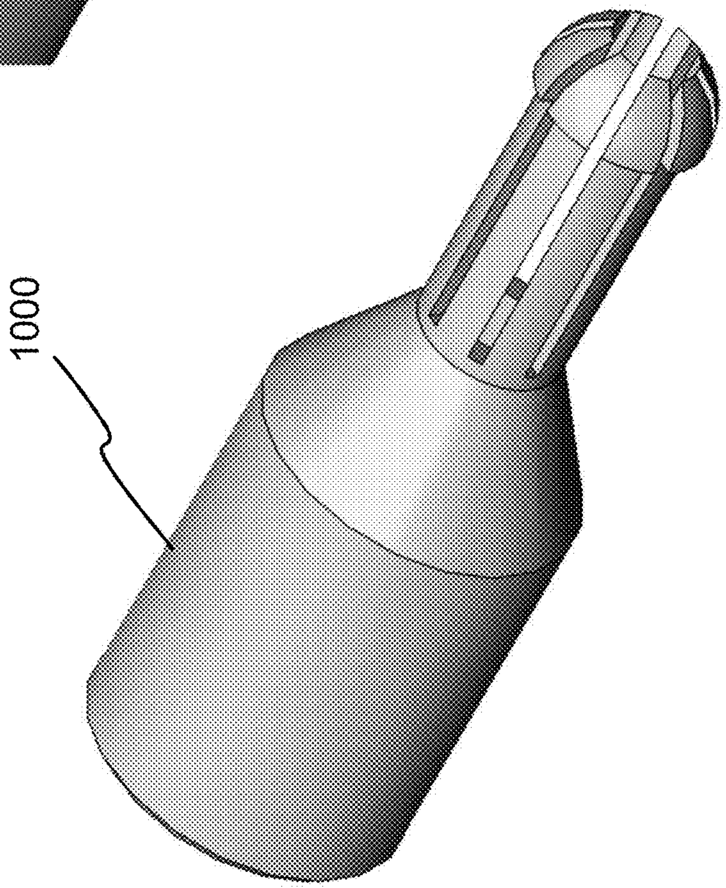

In some implementations, these collet features may be internal. To illustrate, FIGS. 10A-10B are perspective views of an example internal collet linking for buoyant pieces, according to some embodiments. FIGS. 10A-10B depict an internal collet 1000. FIG. 10B depicts the internal collet 1000 that is positioned within an end 1002 of an adjacent articulating link.

Figure 11A:
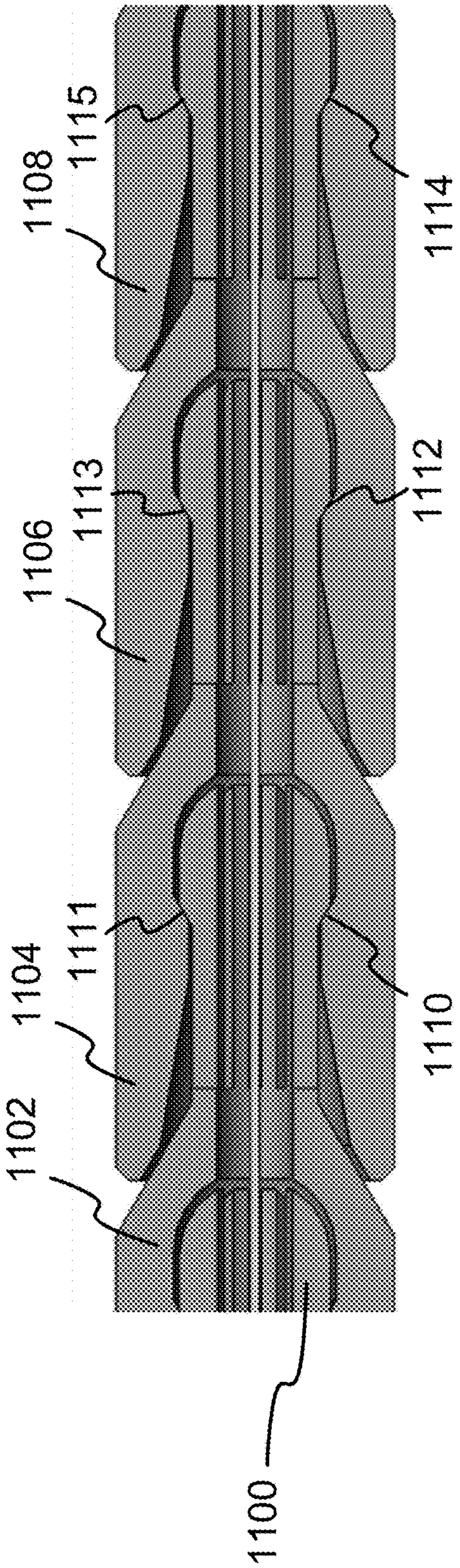
FIG. 11A is schematic side view of example separable collet links, according to some embodiments.
Figure 11B:
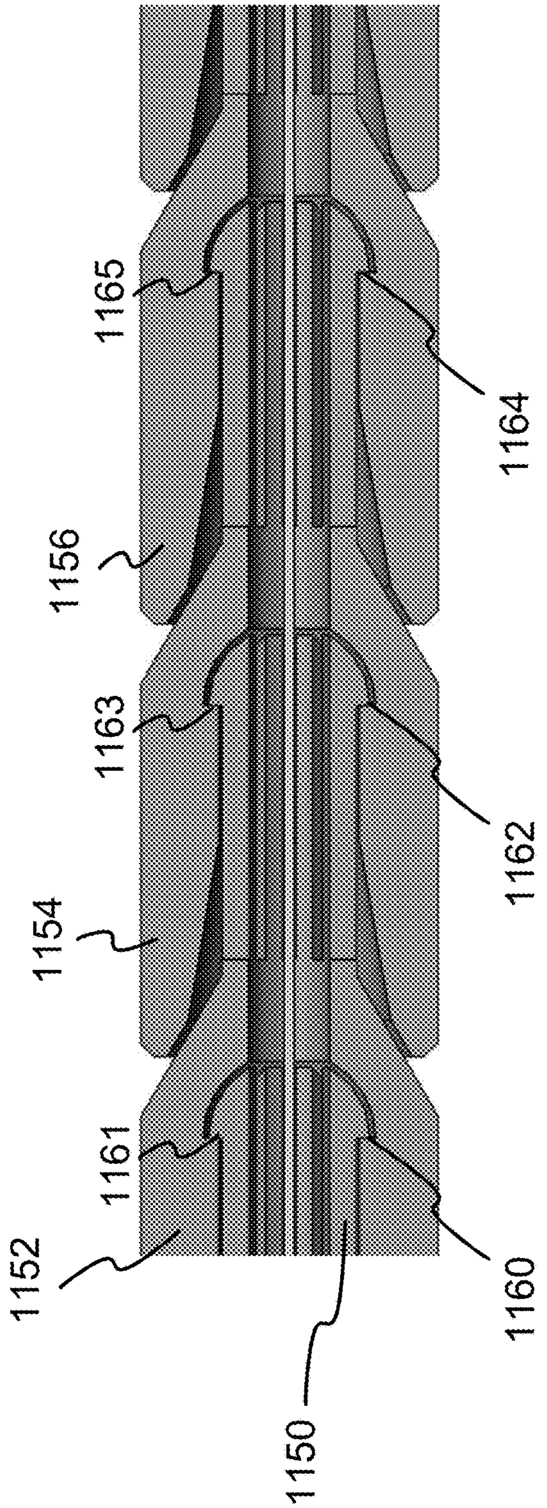
FIG. 11B is schematic side view of example inseparable collet links, according to some embodiments.

As shown in FIGS. 11A-11B, these collets may be internal such that that the ball joint is internal itself, which may then snap internally to the next link. In some implementations, the collets may be separable or inseparable-depending on the need to take apart the pieces prior to being run downhole. To illustrate, FIG. 11A is schematic side view of example separable collet links, according to some embodiments. FIG. 11A includes a collet link 1100 that is positioned in a collet link 1102. The collet link 1102 includes an internal opening to receive the collet link 1100. The internal opening of the collet link 1102 includes internal surfaces 1110-1111 that are angled so that the collet link 1100 may be separable from the collet link 1102. A collet link 1104 includes an internal opening to receive the collet link 1102. The internal opening of the collet link 1104 includes internal surfaces 1112-1113 that are angled so that the collet link 1102 may be separable from the collet link 1104. A collet link 1106 includes an internal opening to receive the collet link 1104. The internal opening of the collet link 1106 includes internal surfaces 1114-1115 that are angled so that the collet link 1104 may be separable from the collet link 1106.

FIG. 11B is schematic side view of example inseparable collet links, according to some embodiments. FIG. 11B includes a collet link 1150 that is positioned in a collet link 1152. The collet link 1152 includes an internal opening to receive the collet link 1150. The internal opening of the collet link 1152 includes internal surfaces 1160-1161 that are generally perpendicular to the internal opening so that the collet link 1150 may not be separable from the collet link 1152. A collet link 1154 includes an internal opening to receive the collet link 1152. The internal opening of the collet link 1154 includes internal surfaces 1162-1163 that are generally perpendicular to the internal opening so that the collet link 1152 may not be separable from the collet link 1154. A collet link 1156 includes an internal opening to receive the collet link 1154. The internal opening of the collet link 1156 includes internal surfaces 1154-1155 that are generally perpendicular to the internal opening so that the collet link 1154 may not be separable from the collet link 1156.

In some material configurations, such as making the links from syntactic foam material, the material may be too brittle to have working collet features. In this case, the links may be made of a composite material with the main body being made of syntactic foam and the collet feature being made of a lightweight plastic and/or metal. One issue that could arise while running/retrieving the tool is the breaking of one of the links, which could result in the articulating buoy chain separating, leaving a large piece of essentially unfishable material downhole.

Figure 12B:
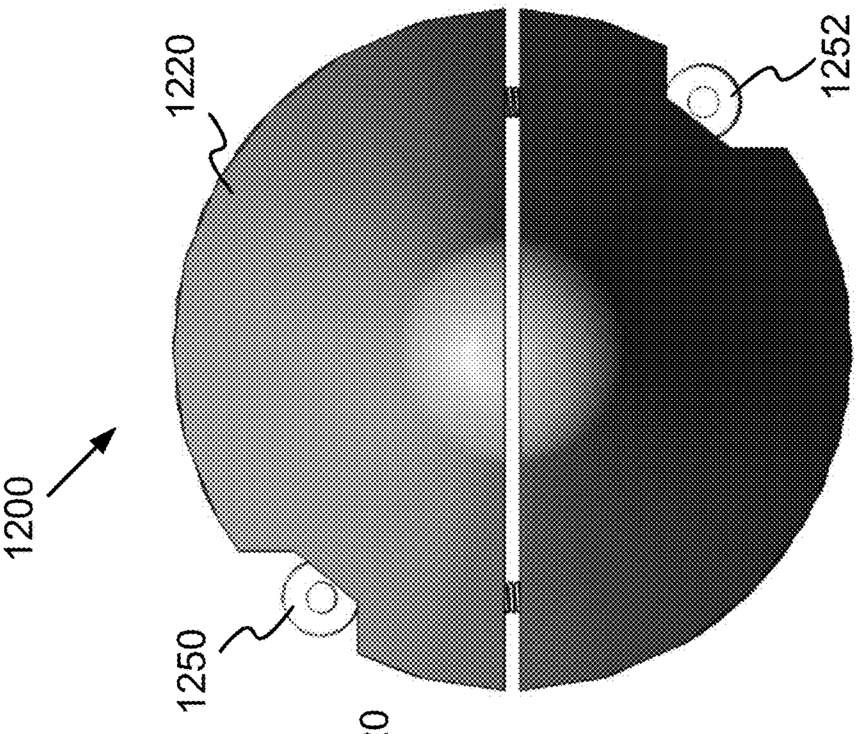
FIGS. 12A-12B are a perspective view and a front view, respectively, of an articulating buoy string that includes buoys and that includes eye-bolts for a connecting wire for connecting the buoys, according to some embodiments.
Figure 12A:
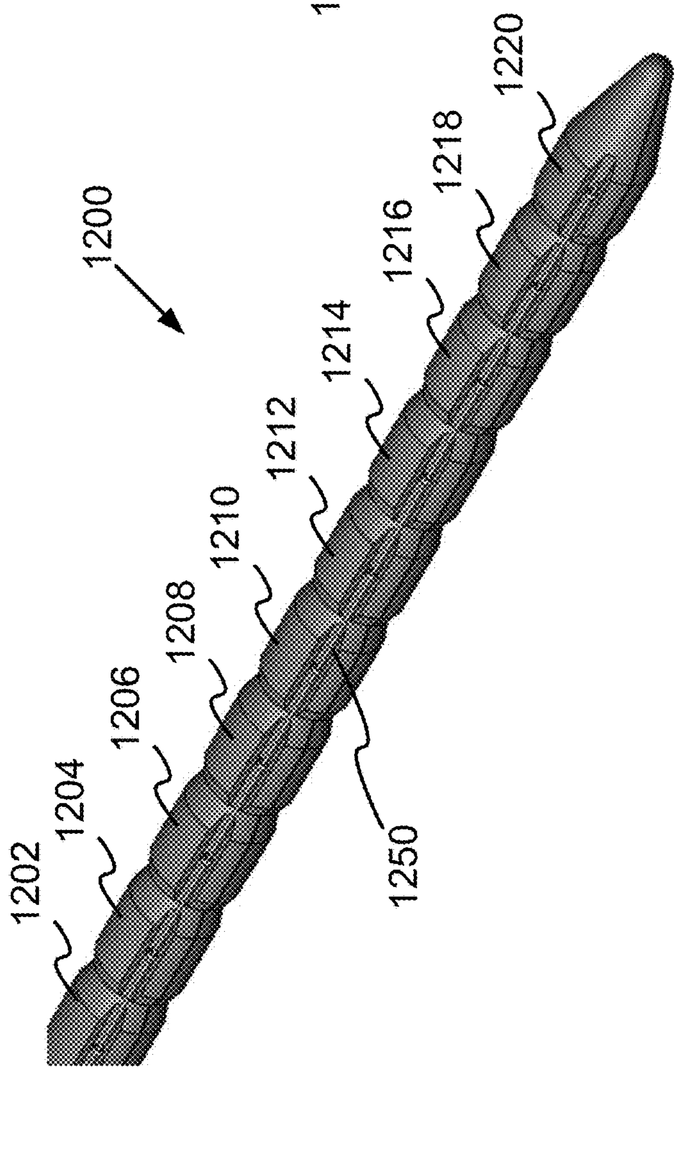

To mitigate this, a braided steel wire may be added between all the links, to hold the pieces together even if they break apart. In some implementations, the wire may be held to the buoy pieces using eye bolts attached to fasteners. In some implementations, more than one wire may be run across the multiple buoy pieces. To illustrate, FIGS. 12A-12B are a perspective view and a front view, respectively, of an articulating buoy string that includes buoys and that includes eye-bolts for a connecting wire for connecting the buoys, according to some embodiments. In particular, FIGS. 12A-12B depict an articulating buoy string 1200. FIG. 12A depicts the articulating buoy string 1200 that includes buoys 1202-1220. The buoy 1202 is adjacent to and inserted into an opening of the buoy 1204. The buoy 1204 is adjacent to and inserted into an opening of the buoy 1206. The buoy 1206 is adjacent to and insert into an opening of the buoy 1208. The buoy 1208 is adjacent to and inserted into an opening of the buoy 1210. The buoy 1210 is adjacent to and inserted into an opening of the buoy 1212. The buoy 1212 is adjacent to and inserted into an opening of the buoy 1214. The buoy 1214 is adjacent to and inserted into an opening of the buoy 1216. The buoy 1216 is adjacent to and inserted into an opening of the buoy 1218. The buoy 1218 is adjacent to and inserted into an opening of the buoy 1220. FIG. 12B depicts a front view of the buoy 1220. The articulating buoy string 1200 also includes eye-bolts for two connecting wires 1250-1252 for connecting the buoys 1202-1220 together.

Figure 13:
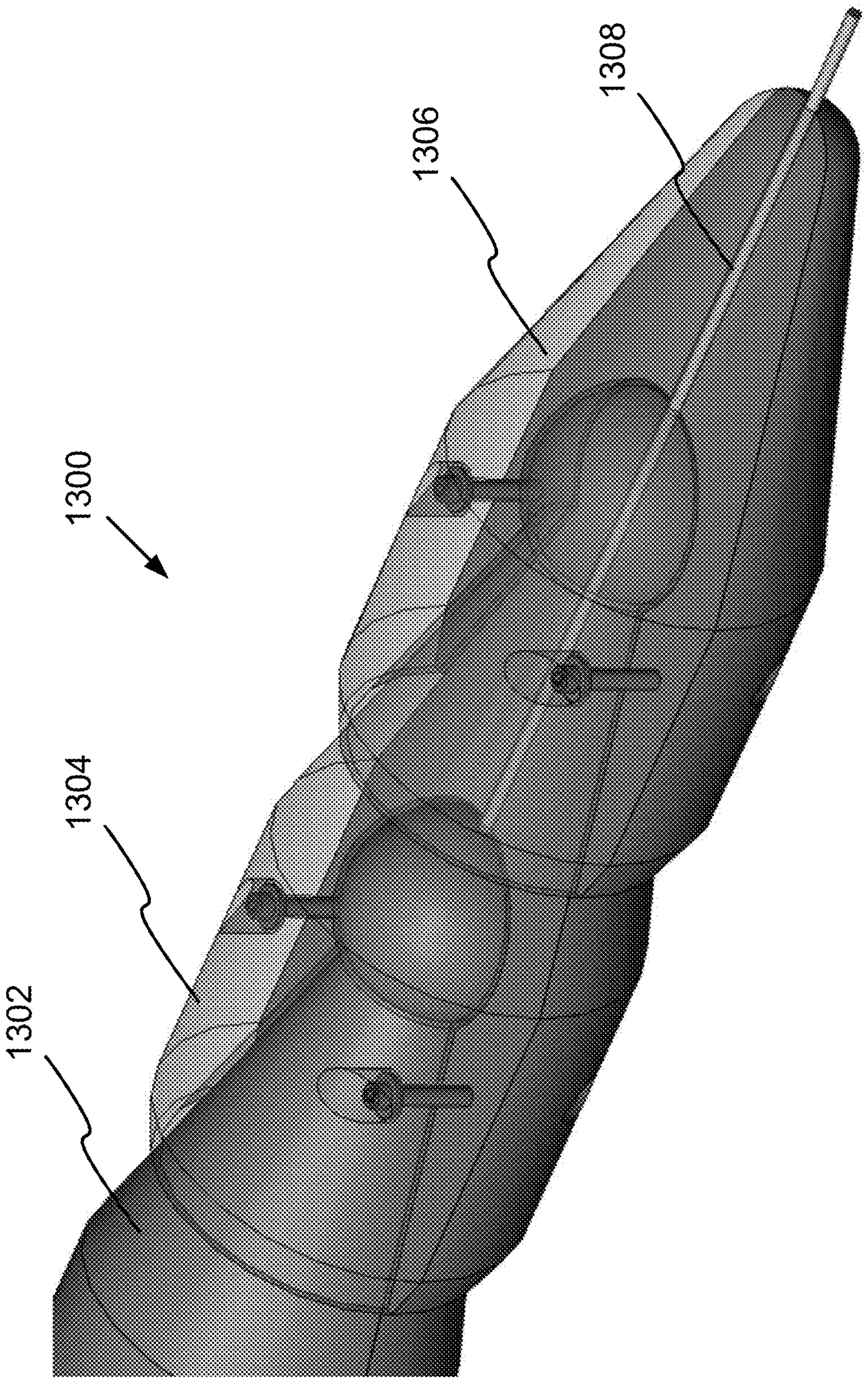
FIG. 13 is a perspective view of an articulating buoy string showing an interior connecting wire, according to some embodiments.

In some implementations, the wire may be held internally to the pieces and may be run through an inner diameter of the buoy components to prevent snagging while being run in hole. To illustrate, FIG. 13 is a perspective view of an articulating buoy string showing an interior connecting wire, according to some embodiments. In particular, FIG. 13 depicts an articulating buoy string 1300 that includes buoys 1302-1306. The buoy 1302 is adjacent to and inserted into an opening of the buoy 1304. The buoy 1304 is adjacent to and inserted into an opening of the buoy 1306. Additionally, the articulating buoy string 1300 includes an interior connecting wire 1308 running through the buoys 1302-1306.

Figure 14A:
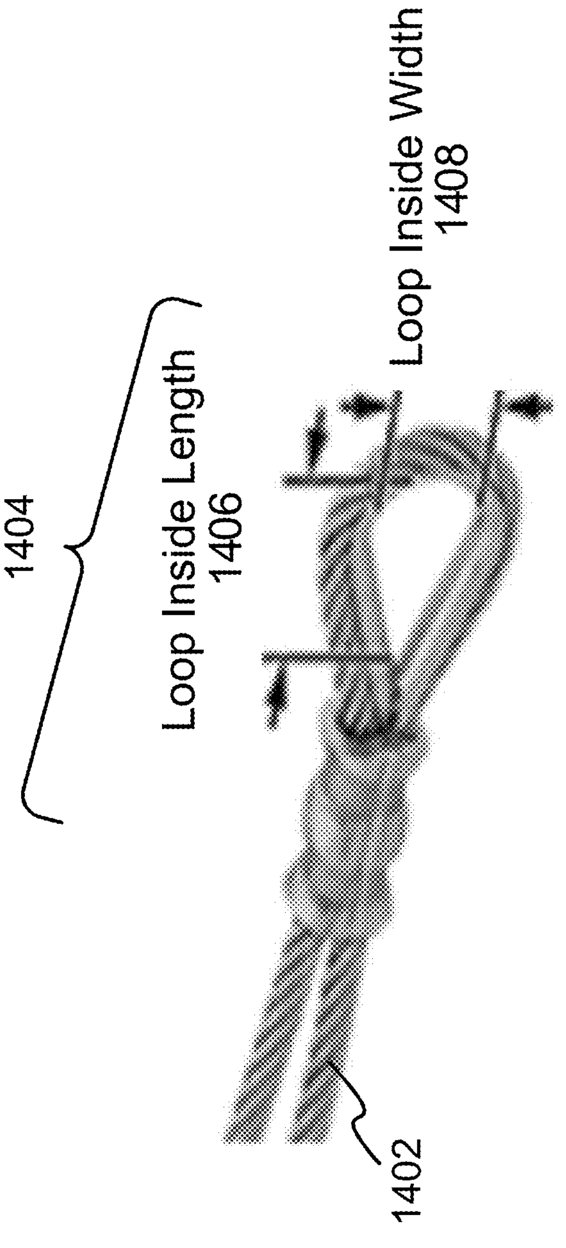
FIGS. 14A-14B are perspective views of an example cable thimble anchor for the interior connecting wire for the articulating buoy string of FIG. 13, according to some embodiments.
Figure 14B:
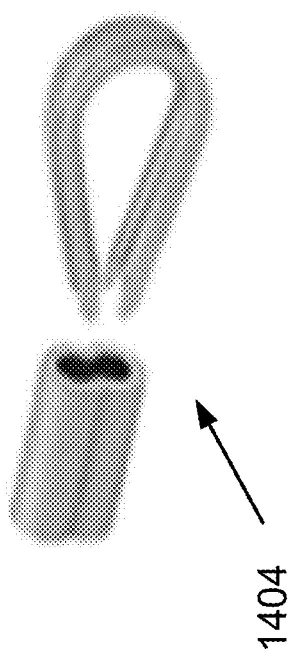

On the nose component, a larger inner diameter chamber may be machined in the bottom, where an anchor/cable thimble may be applied on the wire to create a stop to keep the wire in place. To illustrate, FIGS. 14A-14B are perspective views of an example cable thimble anchor for the interior connecting wire for the articulating buoy string of FIG. 13, according to some embodiments. FIGS. 14A-14B depict a wire 1402 wherein an anchor/cable thimble 1404 is applied to the end of the wire 1402 to keep the wire 1402 in place in the buoy string. The end of the wire 1402 forms a loop having a loop inside length 1406 and a loop inside width 1408. This securing using an anchor/cable thimble may be done on either end of the buoy components to keep the wire in place and keep the components together even after a separation. In some implementations, slack may be left in the wire to allow the links to articulate fully.

When the lateral leg is in place and sealed inside the liner, production flow may flow either over or through the articulating links. In order to achieve an ideal flow area, channels may need to be cut on the outer diameter of the articulating links. Alternatively or in addition, flow channels may be drilled through these links. In some implementations, a lightweight/flexible joint of tubing may be positioned behind and coupled to these articulating buoy links. The buoys on the bottom end of this joint tubing do not need to lift this joint tubing into the lateral bore. However, the joint tubing being flexible and/or lightweight may help guide the joint tubing out the window behind the buoys.

In some implementations, a ball pivot anchor may be positioned between this flexible joint tubing and the articulating buoy links. For example, the ball pivot anchor may be composed of a lightweight metal. In some implementations, a perforated tube may be positioned at the top of the flexible joint tubing (between the flexible joint tubing and the lateral bore string). This perforated tube may act as an access point for the production fluid coming from the lateral bore and into the lateral junction leg. In some implementations, an MLT open hole stinger tool/assembly (having a swell packer) may be positioned behind this perforated tubing. This swell packer may be used to tie the lateral bore liner back to the lateral leg of the junction tool. This swell packer may be shrouded and no-go's on the top of the lateral liner. This may shear the shroud and expose the swell packer, which seals inside the liner inner diameter (as shown in FIGS. 8-9 further described above). In some implementations, no go is a position where the string or tubing is stopped because of an inner diameter restriction.

Example Buoyancy Joints

Figure 15A:
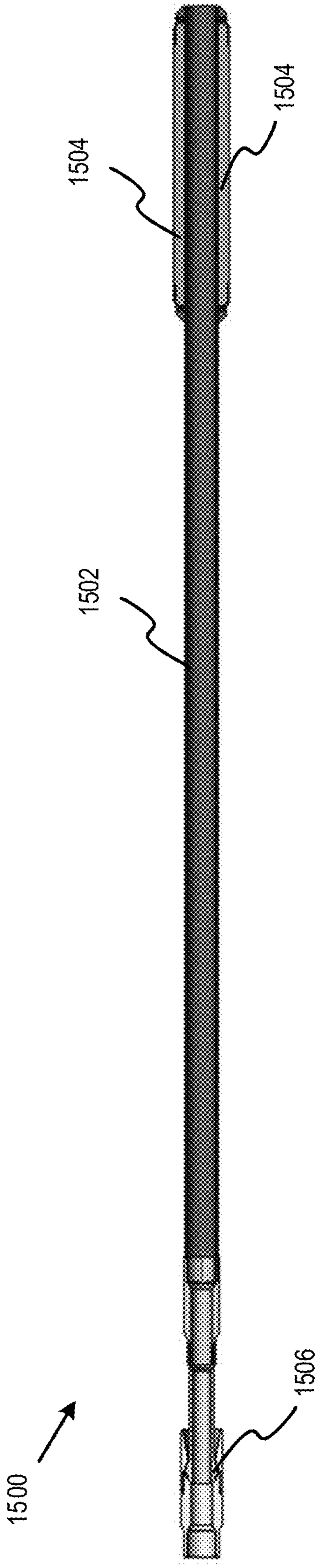
FIG. 15A is a schematic side view of an example guidance sub that includes buoyancy stringer/tool, according to some embodiments.

Other example implementations are now described. FIG. 15A is a schematic side view of an example guidance sub that includes buoyancy stringer/tool, according to some embodiments. FIG. 15A depicts a guidance sub 1500 to guide the lateral leg sub into the secondary wellbore. The guidance sub 1500 may include a light weight joint 1502 that may be composed of carbon fiber or similar material. A buoyant sub 1504 may be positioned at a bottom end of the buoyancy joint 1502. In some implementations, the buoyancy joint 1502 may be composed of carbon fiber. The buoyant sub 1504 may be configured as various geometric designs (such as crescents, doughnuts, cylinders, etc.). An articulating joint 1506 may be positioned at the end opposite the bottom end and coupled to this end of the buoyancy joint 1502.

As the guidance sub 1500 begins to enter the multilateral window, the buoyant sub 1504 may lift the bottom end of the lightweight joint and may guide the lightweight joint (the buoyancy joint 1502) into a secondary wellbore. Such implementations may require the top end of the joint to either flex or articulate. In some implementations, an articulating sub may be run between this joint and the rest of the lateral leg tubing string.

Figure 15B:
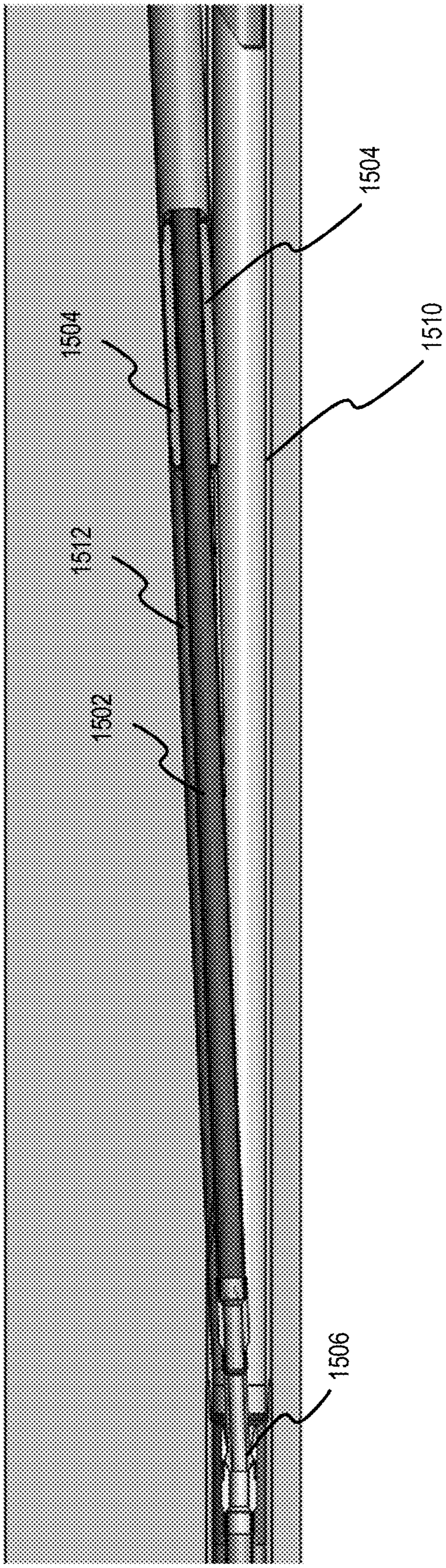
FIG. 15B is a schematic side view of the example guidance sub that includes a buoyancy stinger/tool of FIG. 15A exiting into a secondary wellbore, according to some embodiments.

To illustrate, FIG. 15B is a schematic side view of the example guidance sub that includes a buoyancy stinger/tool of FIG. 15A exiting into a secondary wellbore, according to some embodiments. As shown, the buoyant sub 1504 exits a primary wellbore 1510 into a secondary wellbore 1512—causing the joint 1502 to also exit into the secondary wellbore 1512. The articulating joint 1506 also rotates upward in response to the buoyant sub 1504 exiting into the secondary wellbore 1512.

Figure 15C:
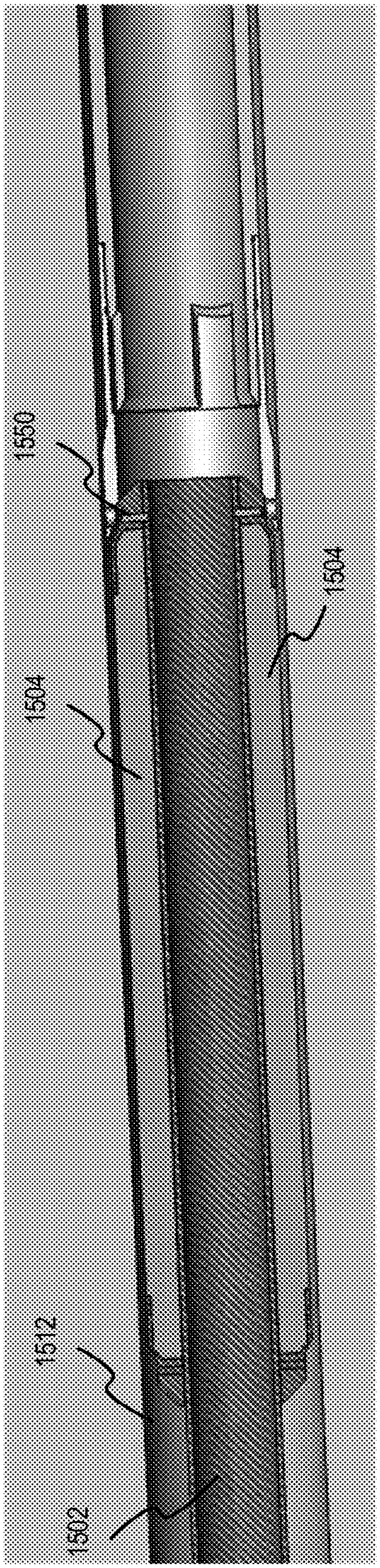
FIG. 15C is a schematic side view of an example buoyancy joint of FIG. 15B tagging on top of liner, according to some embodiments.

FIG. 15C is a schematic side view of an example buoyancy joint of FIG. 15B tagging on top of liner, according to some embodiments. In particular, once the buoyant sub 1504 travels far enough into the secondary wellbore 1512, the buoyant sub no-go's against the top of the liner at a location 1650 in the secondary wellbore 1512.

Figure 15D:
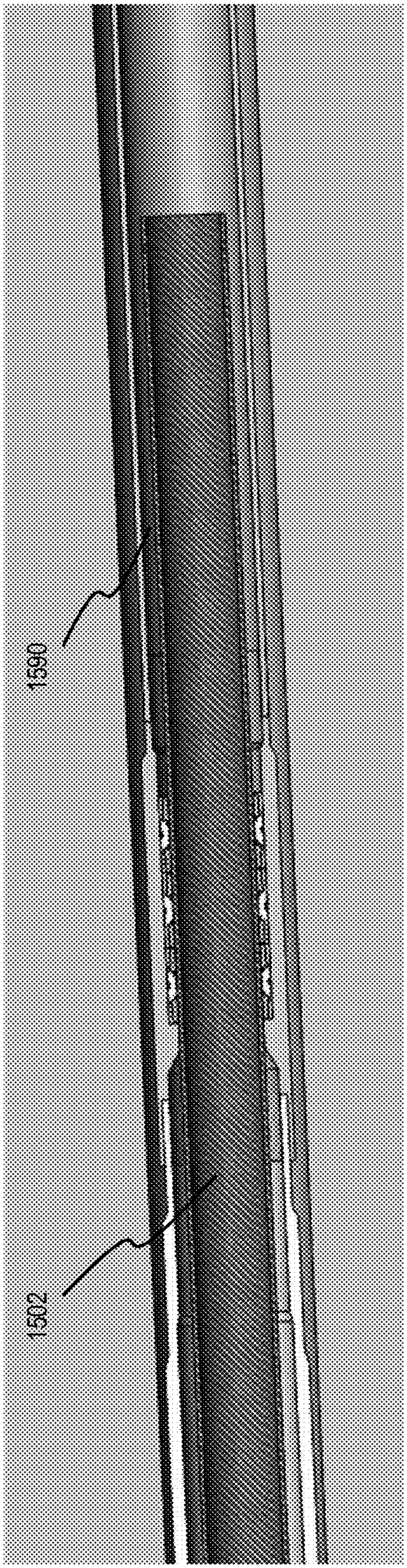
FIG. 15D is a schematic side view of an example buoyancy joint of FIG. 15C after shearing of the screws such that the buoyancy joint extends further into the secondary wellbore and seals, according to some embodiments.

FIG. 15D is a schematic side view of an example buoyancy joint of FIG. 15C after shearing of the screws such that the buoyancy joint extends further into the secondary wellbore and seals, according to some embodiments. In particular, the buoyancy joint 1502 extends further into the secondary wellbore 1512 beyond the location 1550 (the no-go' position). The buoyancy joint 1502 seals inside a liner 1590 in the secondary wellbore 1512.

The buoyancy joint 1502 may seal inside the liner 1590 to tie the liner 1590 back to the lateral junction leg. Thus, this configuration includes the buoyancy joint 1502 that the buoyant sub 1504 rides on acting also as a seal stinger, extending into the liner 1590 and sealing against interior seals.

Figure 16:
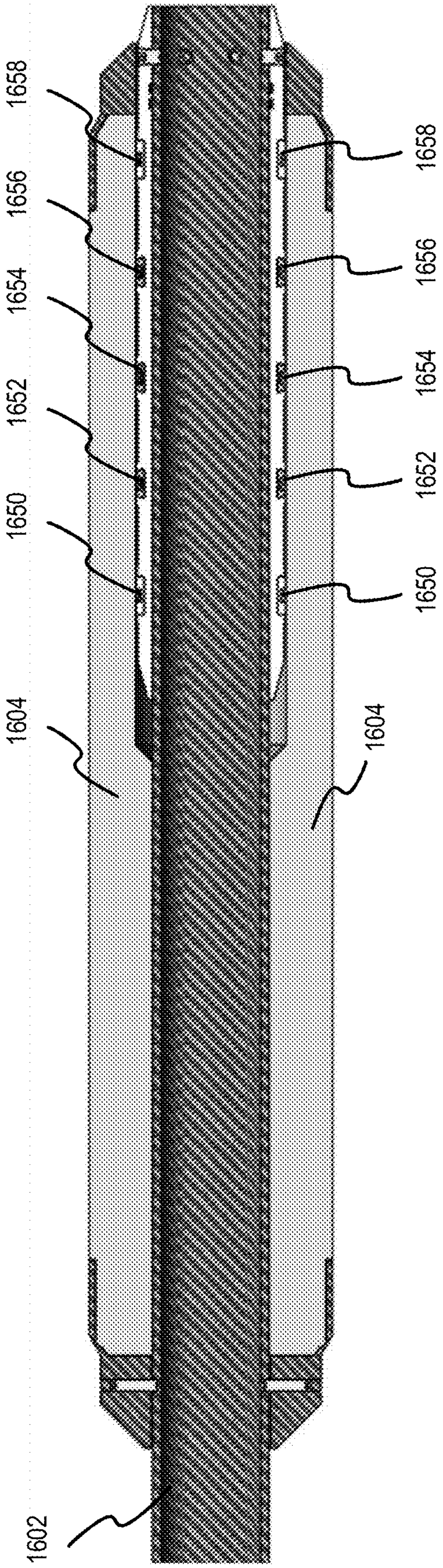
FIG. 16 is a schematic side view of a buoyancy sub with shrouded exterior seals, according to some embodiments.

In some implementations, an exterior seal may be run that is set on the buoyant joint, which is shrouded by the buoyant sub. To illustrate, FIG. 16 is a schematic side view of a buoyancy sub with shrouded exterior seals, according to some embodiments. In FIG. 16, a buoyancy sub 1604 may act as a shroud for a number of seals 1650-1658. A portion of a seal sub 1602 is positioned within the buoyancy sub 1604 with the seals 1650-1658 between the seal sub 1602 and the buoyancy sub 1604.

Figure 17:
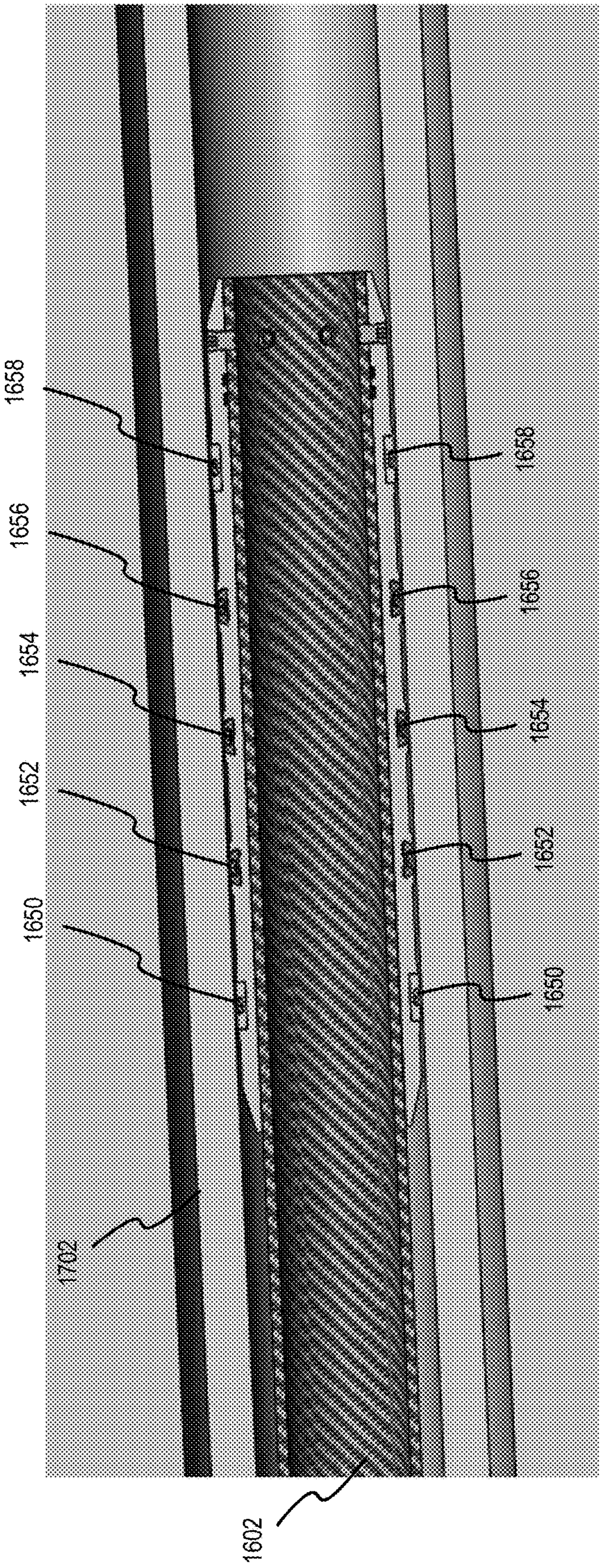
FIG. 17 is a schematic side view of seals inside a seal bore inner diameter of a lateral liner, according to some embodiments.

FIG. 17 is a schematic side view of the seals and seal sub of FIG. 16 after being pushed down a lateral liner beyond the no-go position of the buoyancy sub, according to some embodiments. In particular, when the buoyancy sub 1604 no-go's against a liner 1702 and shears, the seals 1650-1658 and the seal sub 1602 may travel down into the liner 1702. The seals 1650-1657 may seal the seal sub 1602 in the inner diameter of the liner 1702. In some implementations, the buoyancy sub 1604 may not have the strength to withstand a no-go/shear set down weight. Therefore, the buoyancy sub 1604 may be capped and/or encased in a higher strength material, such as carbon fiber or light material.

Example Spring-Based Guidance Subs

In some implementations, a non-buoyant option may be implemented that uses mechanical solutions to deflect the lateral string into the lateral bore. For example, the mechanical solution may include a collapsible leaf spring.

Figure 18B:
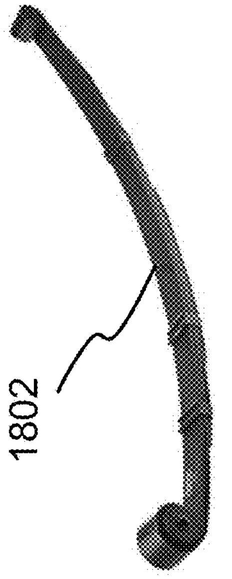
FIG. 18B is a perspective view of a collapsible leaf spring to be placed in the guidance sub of FIG. 18A, according to some embodiments.
Figure 18A:
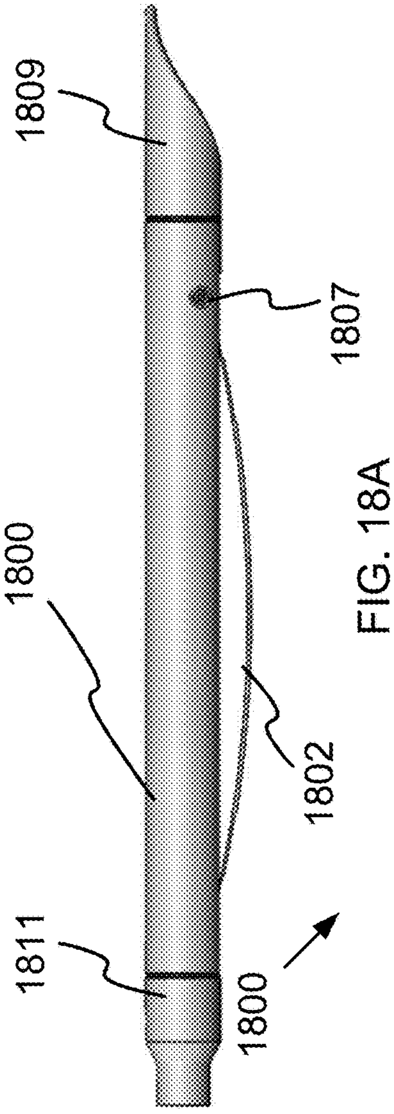
FIG. 18A is a schematic side view of a guidance sub having a collapsible leaf spring, according to some embodiments.
Figure 18C:
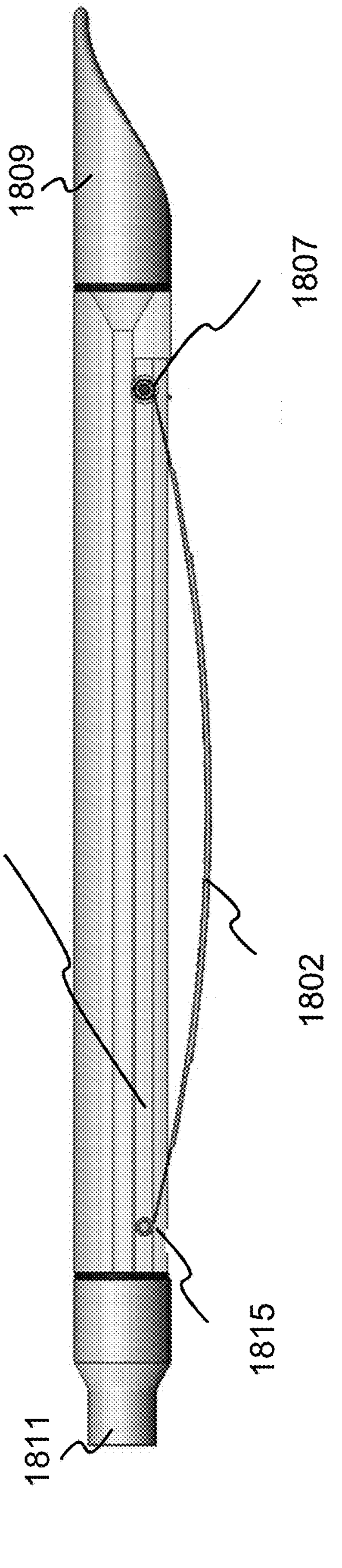
FIG. 18C is a partial cross-sectional side view of a mechanical guidance sub of FIG. 18A, according to some embodiments.

To illustrate, FIG. 18A is a schematic side view of a guidance sub having a collapsible leaf spring, according to some embodiments. FIG. 18B is a perspective view of a collapsible leaf spring to be placed in the guidance sub of FIG. 18A, according to some embodiments. FIG. 18C is a partial cross-sectional side view of a mechanical guidance sub of FIG. 18A, according to some embodiments.

FIGS. 18A and 18C depict a guidance sub 1800 that includes a collapsible leaf spring 1802. In this example, one side of the guidance sub 1800 may include a top thread 1811. The opposite side of the guidance sub 1800 may include a muleshoe 1809. The guidance sub 1800 also includes a bolt coupled to one end of the collapsible leaf spring 1802.

Also shown in FIG. 18C, the guidance sub 1800 also includes a roller 1815 that is coupled to an end of the collapsible leaf spring 1802 that is opposite the bolt 1807. The guidance sub 1800 also includes a track 1817 along which the roller 1815 may move. In particular, the collapsible leaf spring 1802 may be contained by the roller 1815 and the bolt 1807. The end of the collapsible leaf spring 1802 that is coupled to the bolt 1807 may remain pinned in a fixed position. The end of the collapsible leaf spring 1802 that is coupled to the roller 1815 may roll along the track 1817 toward the end coupled to the bolt 1807. As the collapsible leaf spring 1802 bows outward away from the body of the guidance sub 1800, the roller 1815 may roll along the track 1817 toward the bolt 1807. FIG. 18B further depicts the collapsible leaf spring 1802.

Figure 18D:
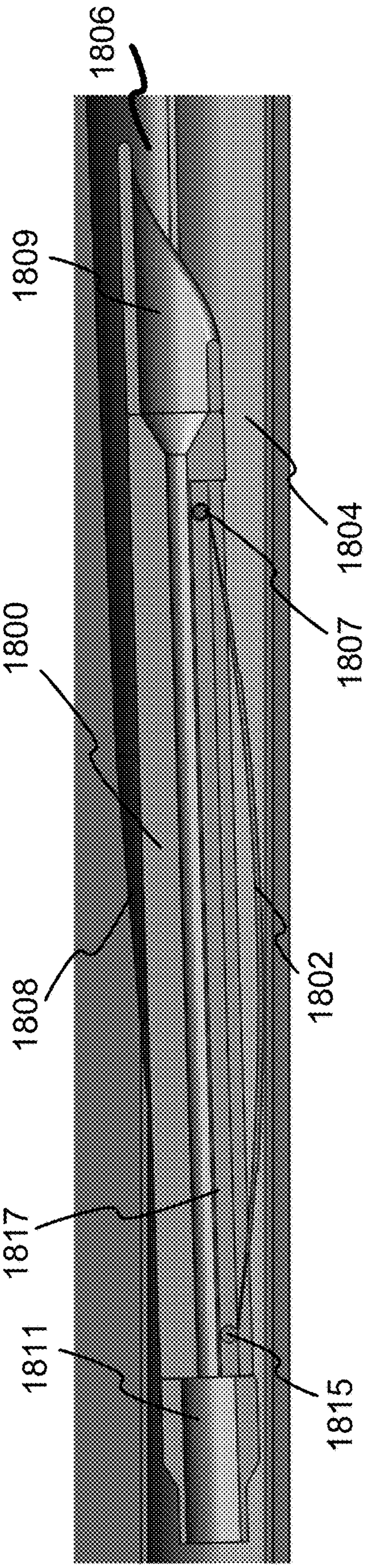
FIG. 18D is a cross-sectional side view of a mechanical guidance sub of FIGS. 18A and 18C that includes the collapsible leaf spring of FIG. 18B such that the spring pushes the guidance sub of FIG. 18B upwards out the window to the lateral wellbore, according to some embodiments.

FIG. 18D is a cross-sectional side view of a mechanical guidance sub of FIGS. 18A and 18C that includes the collapsible leaf spring of FIG. 18B such that the spring pushes the guidance sub of FIG. 18B upwards out the window to the lateral wellbore, according to some embodiments. As shown in FIG. 18D, the guidance sub 1800 (having the collapsible leaf spring 1802) such that the collapsible leaf spring 1802 pushes the guidance sub 1800 upwards out from a main wellbore 1804 and into a lateral wellbore 1806 through a window 1808.

Also shown in FIG. 18D, the guidance sub 1800 also includes the roller 1815 that is coupled to an end of the collapsible leaf spring 1802 that is opposite the bolt 1807. The guidance sub 1800 also includes the track 1817 along which the roller 1815 may move. In particular, the collapsible leaf spring 1802 may be contained by the roller 1815 and the bolt 1807. The end of the collapsible leaf spring 1802 that is coupled to the bolt 1807 may remain pinned in a fixed position. The end of the collapsible leaf spring 1802 that is coupled to the roller 1815 may roll along the track 1817 toward the end coupled to the bolt 1807. As the collapsible leaf spring 1802 bows outward away from the body of the guidance sub 1800, the roller 1815 may roll along the track 1817 toward the bolt 1807.

Figure 18E:
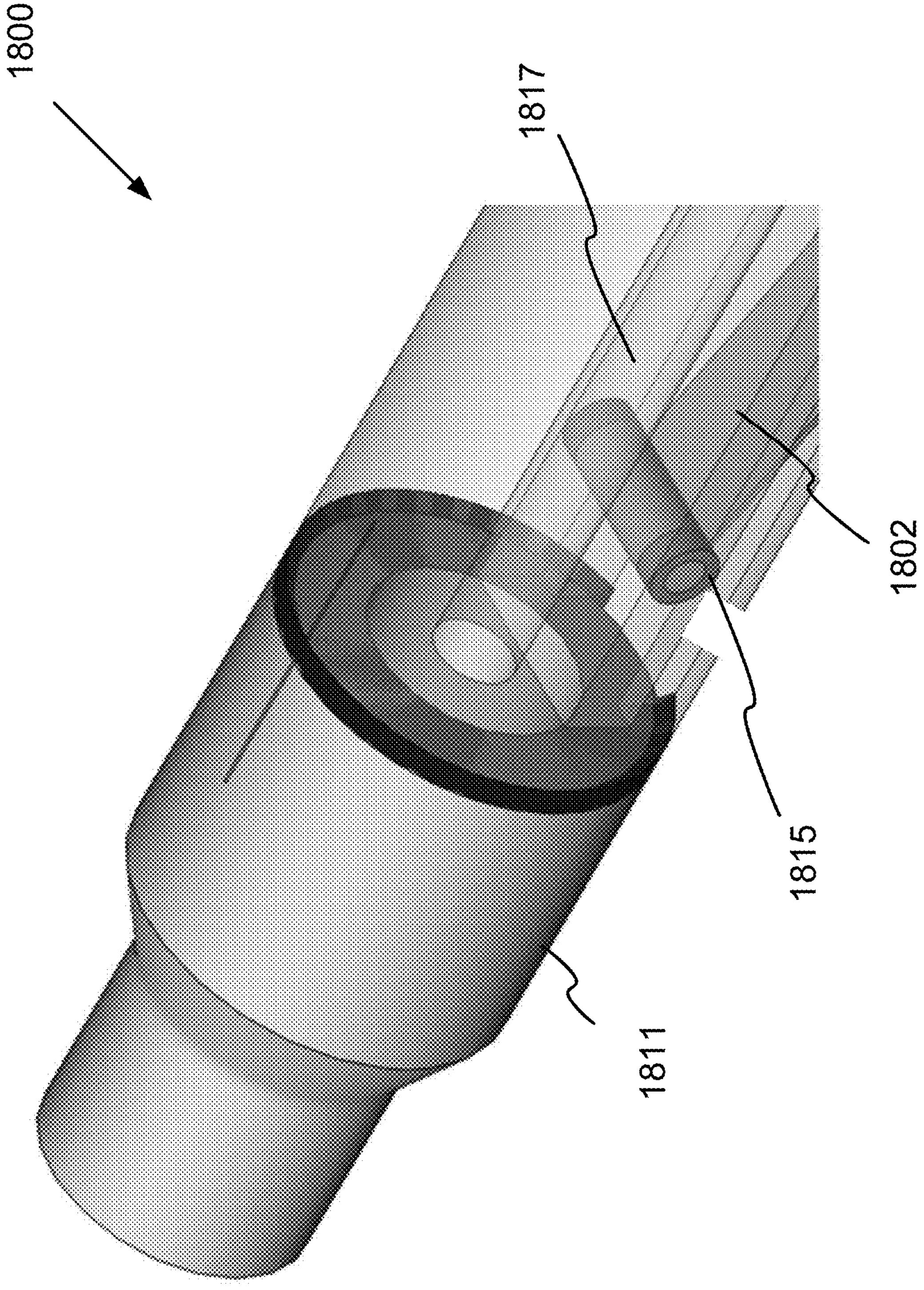
FIG. 18E is a more detailed perspective view of the top end of mechanical guidance sub of FIGS. 18A and 18C-18D, according to some embodiments.

FIG. 18E is a more detailed perspective view of the top end of mechanical guidance sub of FIGS. 18A and 18C-18D, according to some embodiments. As shown in FIG. 18E, the guidance sub 1800 includes the top end 1811. Adjacent to the top end 1811, the roller 1815 is coupled to the collapsible leaf spring 1802 and positioned in the track 1817 to be movable along the track 1817 as the collapsible leaf spring 1802 collapses to enable the guidance sub 1800 to enter smaller inner diameters (such as the inner diameter of the later liner).

Figure 18F:
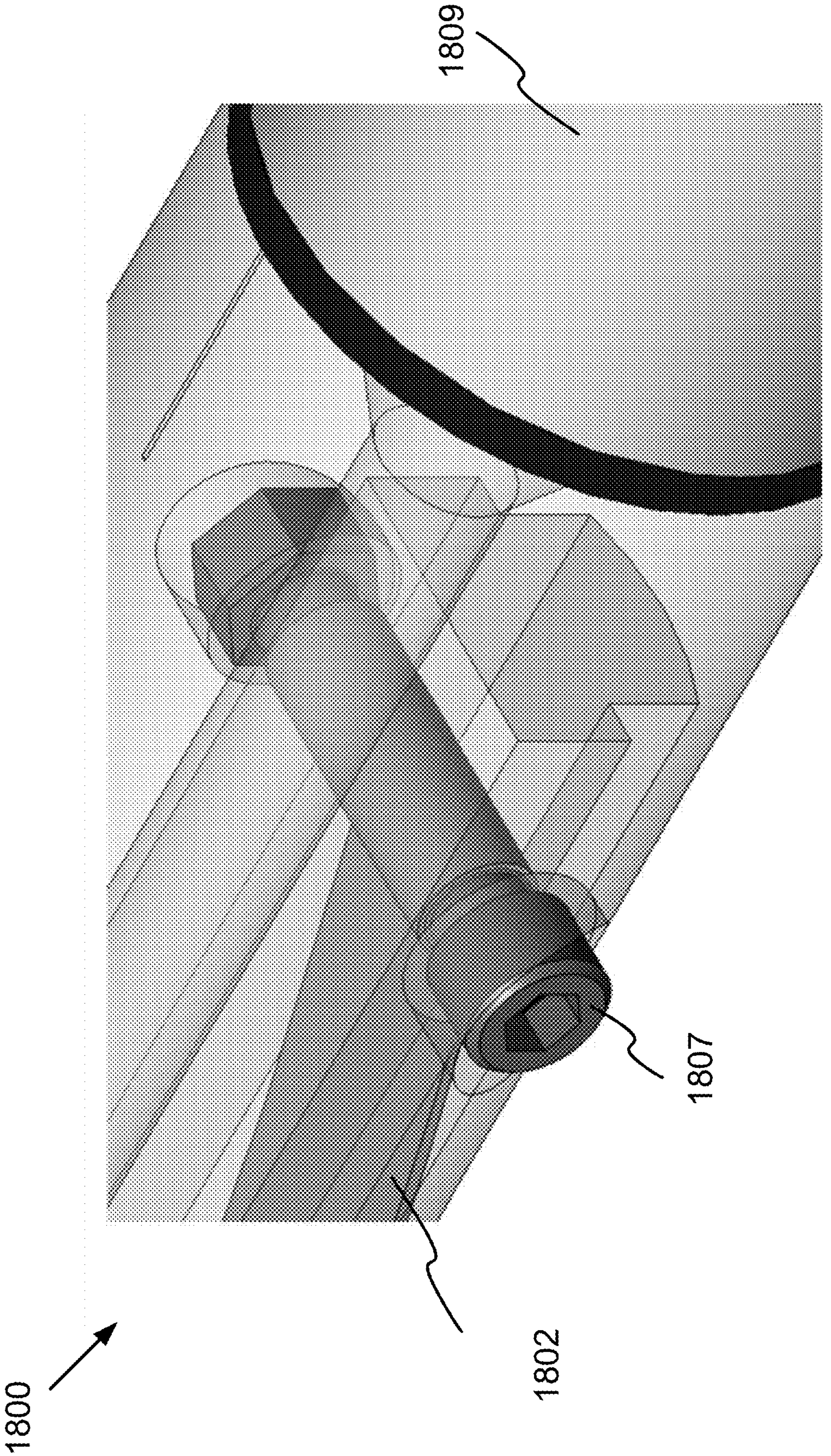
FIG. 18F is a more detailed perspective view of an end (opposite the top end) of mechanical guidance sub of FIGS. 18A and 18C-18D, according to some embodiments.

FIG. 18F is a more detailed perspective view of an end (opposite the top end) of mechanical guidance sub of FIGS. 18A and 18C-18D, according to some embodiments. As shown in FIG. 18F, the guidance sub 1800 includes the muleshoe 1809. Adjacent to the muleshoe 1809, the bolt 1807 is coupled to the collapsible leaf spring 1802 (opposite the end where the roller 1815 is positioned.

Figure 18G:
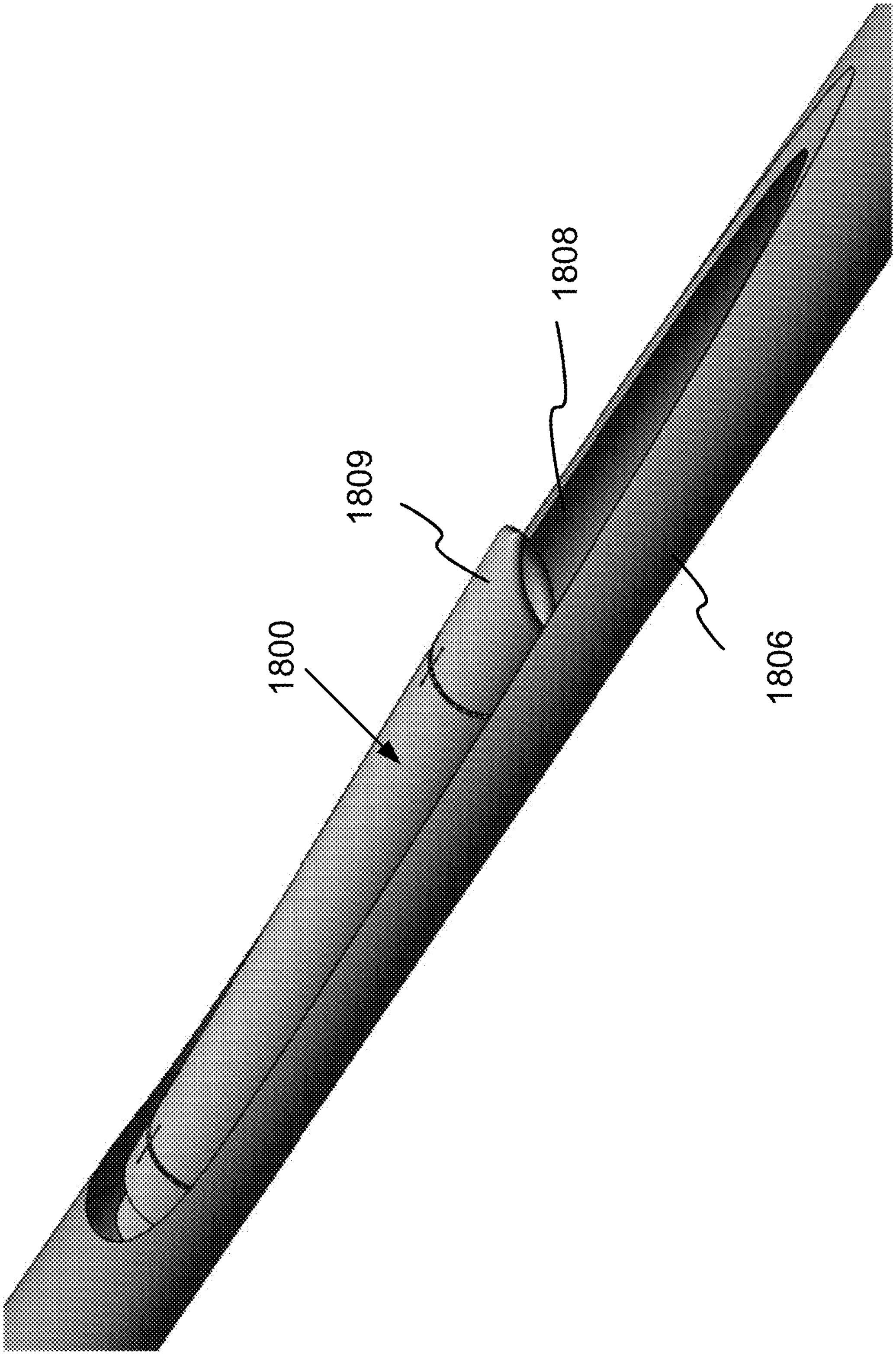
FIG. 18G is a perspective view of the guidance sub of FIGS. 18A-18F, showing the leaf spring pushing the guidance sub out of window, according to some embodiments.

FIG. 18G is a perspective view of the guidance sub of FIGS. 18A-18F, showing the leaf spring pushing the guidance sub out of window, according to some embodiments. As shown in FIG. 18G, when the guidance sub 1800 begins to enter the window 1808 and has room to expand, the collapsible leaf spring pushes the guidance sub 1800 upwards, where the muleshoe 1809 may stay high enough to pass out the window 1808 and enter into the lateral bore 1806. Once the guidance sub 1800 enters the lateral bore 1806, the inner diameter restriction collapses the collapsible leaf spring and the guidance sub 1800 may further travel into the lateral bore 1806.

Figure 19A:
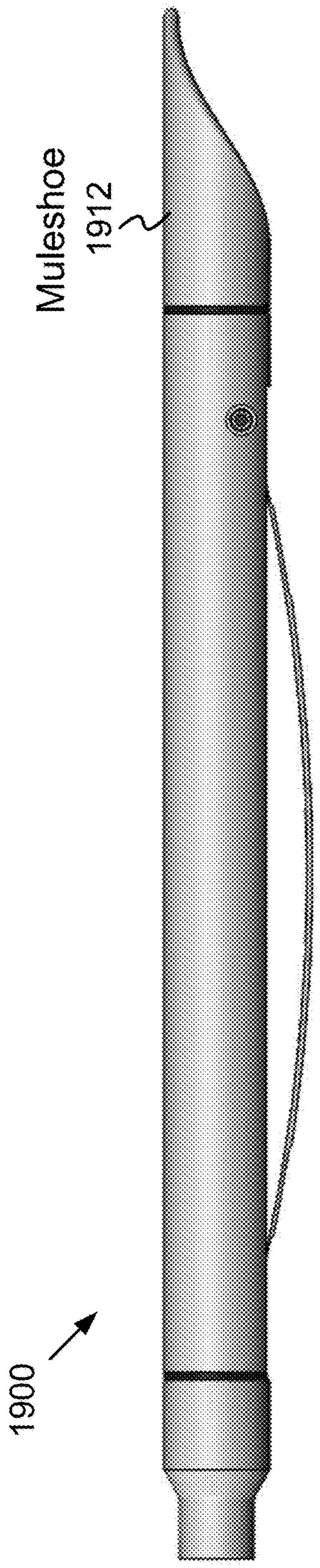
FIGS. 19A-19B are side views of a guidance sub having two different end noses, according to some embodiments.
Figure 19B:
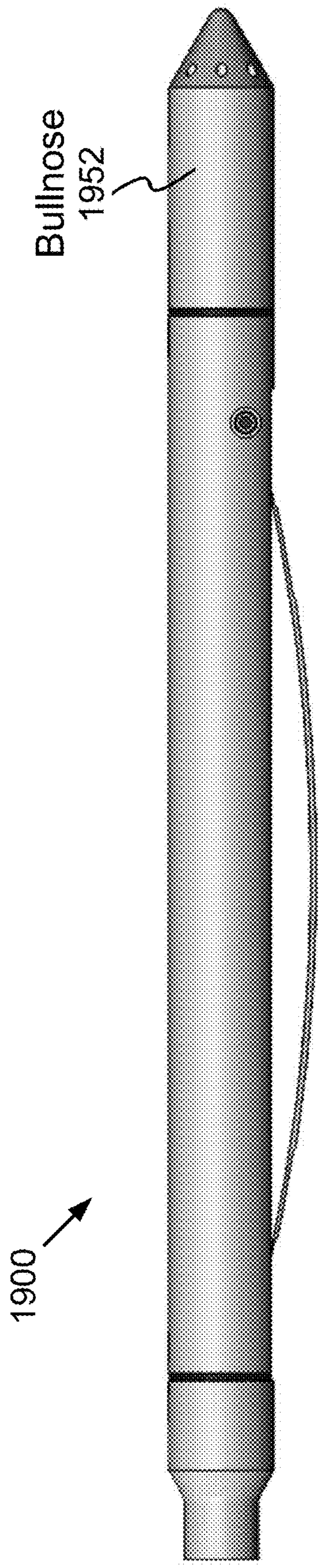

In some implementations, the guidance sub may have different end noses. To illustrate, FIGS. 19A-19B are side views of a guidance sub having two different end noses, according to some embodiments. In FIG. 19A, the shape of the nose on the guidance sub 1900 may be configured such that a reverse muleshoe 2312 may catch the tapered shape of the window opening and ride up it instead of wedging in place against the bottom taper of the window. In FIG. 19B, the guidance sub 1900 may also be outfitted with a bullnose 1952 making it easier to run in hole.

In some implementations, (depending on how the guidance sub is configured) a central inner diameter conduit may be formed or drilled in the guidance sub for lateral flow therethrough. Alternatively or in addition, several flow ports may be formed or drilled in the guidance sub (depending on the position of the leaf spring in the guidance sub). In some implementations, a flexible joint and seals may be coupled behind the guidance sub (similar to those implementations described above).

While the aspects of the disclosure are described with reference to various implementations and exploitations, it will be understood that these aspects are illustrative and that the scope of the claims is not limited to them. Many variations, modifications, additions, and improvements are possible. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed. As used herein, the term "or" is inclusive unless otherwise explicitly noted. Thus, the phrase "at least one of A, B, or C" is satisfied by any element from the set {A, B, C} or any combination thereof, including multiples of any element.

Example Embodiments

Embodiment #1: An apparatus comprising: a guidance sub to be attached to a tubular string for conveyance of the tubular string in a multilateral wellbore, the guidance sub comprising, an articulating buoyancy structure that comprises, multiple buoyancy links comprised of a buoyant material such that the articulating buoyancy structure is to have a buoyancy within a well fluid that is downhole in a primary wellbore, wherein the multiple buoyancy links are coupled together such that joints are formed between the multiple buoyancy links to allow movement between adjacent buoyancy links of the multiple buoyancy links, wherein the articulating buoyance structure is configured to direct guidance sub out of a multilateral window from a main bore and into a lateral bore of the multilateral wellbore.

Embodiment #2: The apparatus of Embodiment #1, wherein the articulating buoyancy structure is configured to have a buoyancy in the well fluid and to articulate to move the guidance sub out of the multilateral window from the main bore and into the lateral bore.

Embodiment #3: The apparatus of any one of Embodiments #1-2, wherein the multilateral window comprises a high side exit from the main bore.

Embodiment #4: The apparatus of any one of Embodiments #1-2, wherein the multilateral window comprises a low side exit from the main bore.

Embodiment #5: The apparatus of any one of Embodiments #1-4, wherein at least one of the joints between the multiple buoyancy links comprises two halves of a current buoyancy link that are placed over a ball joint of a previous buoyancy link, wherein the two halves are held together over the ball joint with at least one of fasteners or epoxy.

Embodiment #6: The apparatus of any one of Embodiments #1-5, wherein at least one of the joints between the multiple buoyancy links comprises a collet link for forming an articulating coupling between adjacent buoyancy links.

Embodiment #7: The apparatus of Embodiment #6, wherein the collet link comprises an external collet link.

Embodiment #8: The apparatus of Embodiment #6, wherein the collet link comprises an internal collet link.

Embodiment #9: The apparatus of any one of Embodiments #6-8, wherein the collet link is inseparable.

Embodiment #10: The apparatus of any one of Embodiments #6-8, wherein the collet link is separable.

Embodiment #11: The apparatus of any one of Embodiments #6-10, wherein at least one buoyancy link is composed of a composite material, wherein a main body of the at least one buoyancy link is composed of a syntactic foam and the collet link of the at least one buoyancy link is composed of at least one of a plastic or a metal.

Embodiment #12: The apparatus of any one of Embodiments #1-11, wherein at least one of the multiple buoyancy links is composed of a material having a latticework structure.

Embodiment #13: The apparatus of any one of Embodiments #1-12, wherein at least one of the multiple buoyancy links is composed of a syntactic foam.

Embodiment #14: The apparatus of Embodiment #13, wherein the syntactic foam comprises hollow spheres composed of at least one of metal, polymer, or ceramic filler.

Embodiment #15: The apparatus of any one of Embodiments #1-14, wherein the articulating buoyancy structure comprises at least one wire configured to run between the multiple buoyancy links.

Embodiment #16: The apparatus of Embodiment #15, wherein the at least one wire is coupled to each of the multiple buoyancy links via a bolt attached to a fastener.

Embodiment #17: The apparatus of Embodiment #15, wherein the at least one wire is run through an inner conduit of each of the multiple buoyancy links.

Embodiment #18: The apparatus of Embodiment #17, wherein a cable thimble anchor is applied to the at least one wire in at least one end buoyancy link of the multiple buoyancy links to anchor the at least one wire to the at least one end buoyancy link.

Embodiment #19: The apparatus of any one of Embodiments #1-18, wherein each of the multiple buoyancy links comprises at least one flow channel for the flow of the well fluid.

Embodiment #20: The apparatus of any one of Embodiments #1-19, wherein the articulating buoyance structure is configured to direct the guidance sub out of the multilateral window from the main bore and into the lateral bore, independent of a deflector tool.

Embodiment #21: A system for a multilateral well, the system comprising: a tubular string; and an articulating buoyancy guidance sub coupled to an end of the tubular string, the articulating buoyancy guidance sub comprising, multiple buoyancy links to be filled with at least one of a gas or a fluid such that the articulating buoyancy guidance sub is to have a buoyancy within a well fluid that is downhole in a wellbore; wherein the multiple buoyancy links are coupled together such that joints are formed between the multiple buoyancy links to allow movement between adjacent buoyancy links of the multiple buoyancy links.

Embodiment #22: The system of Embodiment #21, further comprising a flexible joint positioned behind the articulating buoyancy guidance sub and before the tubular string.

Embodiment #23: The system of any one of Embodiments #21-22, wherein the articulating buoyancy guidance sub is coupled to an end of the tubular string via at least one of an articulating joint or a flexible joint.

Embodiment #24: An apparatus comprising: a guidance sub to be attached to a tubular string for conveyance of the tubular string in a multilateral bore, wherein a mechanical spring is coupled to an outer surface of the guidance sub, wherein the mechanical spring is configured to direct the guidance sub out of a multilateral window from a main bore and into a lateral bore of the multilateral bore, independent of a deflector tool.

Embodiment #25: The apparatus of Embodiment #24, wherein the mechanical spring comprises a collapsible leaf spring.

The invention claimed is:

1. An apparatus comprising:

a guidance sub to be attached to a tubular string for conveyance of the tubular string in a multilateral wellbore, the guidance sub comprising,
  an articulating buoyancy structure that comprises,
    multiple buoyancy links comprised of a buoyant material such that the articulating buoyancy structure is to have a buoyancy within a well fluid that is downhole in a primary wellbore, wherein the multiple buoyancy links are coupled together such that joints are formed between the multiple buoyancy links to allow movement between adjacent buoyancy links of the multiple buoyancy links, wherein the articulating buoyance structure is configured to direct the guidance sub out of a multilateral window from a main bore and into a lateral bore of the multilateral wellbore.

2. The apparatus of claim 1, wherein the articulating buoyancy structure is configured to have a buoyancy in the well fluid and to articulate to move the guidance sub out of the multilateral window from the main bore and into the lateral bore.

3. The apparatus of claim 2, wherein the multilateral window comprises a high side exit from the main bore.

4. The apparatus of claim 2, wherein the multilateral window comprises a low side exit from the main bore.

5. The apparatus of claim 1, wherein at least one of the joints between the multiple buoyancy links comprises two halves of a current buoyancy link that are placed over a ball joint of a previous buoyancy link, wherein the two halves are held together over the ball joint with at least one of fasteners or epoxy.

6. The apparatus of claim 1, wherein at least one of the joints between the multiple buoyancy links comprises a collet link for forming an articulating coupling between adjacent buoyancy links.

7. The apparatus of claim 6, wherein the collet link comprises an external collet link.

8. The apparatus of claim 6, wherein the collet link comprises an internal collet link.

9. The apparatus of claim 6, wherein the collet link is inseparable.

10. The apparatus of claim 6, wherein the collet link is separable.

11. The apparatus of claim 6, wherein at least one buoyancy link is composed of a composite material, wherein a main body of the at least one buoyancy link is composed of a syntactic foam and the collet link of the at least one buoyancy link is composed of at least one of a plastic or a metal.

12. The apparatus of claim 1, wherein at least one of the multiple buoyancy links is composed of a material having a latticework structure.

13. The apparatus of claim 1, wherein at least one of the multiple buoyancy links is composed of a syntactic foam.

14. The apparatus of claim 13, wherein the syntactic foam comprises hollow spheres composed of at least one of metal, polymer, or ceramic filler.

15. The apparatus of claim 1, wherein the articulating buoyancy structure comprises at least one wire configured to run between the multiple buoyancy links.

16. The apparatus of claim 15, wherein the at least one wire is coupled to each of the multiple buoyancy links via a bolt attached to a fastener.

17. The apparatus of claim 15, wherein the at least one wire is run through an inner conduit of each of the multiple buoyancy links.

18. The apparatus of claim 17, wherein a cable thimble anchor is applied to the at least one wire in at least one end buoyancy link of the multiple buoyancy links to anchor the at least one wire to the at least one end buoyancy link.

19. The apparatus of claim 1, wherein each of the multiple buoyancy links comprises at least one flow channel for the flow of the well fluid.

20. The apparatus of claim 1, wherein the articulating buoyance structure is configured to direct the guidance sub out of the multilateral window from the main bore and into the lateral bore, independent of a deflector tool.

21. A system for a multilateral well, the system comprising:

a tubular string; and an articulating buoyancy guidance sub coupled to an end of the tubular string, the articulating buoyancy guidance sub comprising, multiple buoyancy links filled with at least one of a gas or a fluid such that the articulating buoyancy guidance sub has a buoyancy within a well fluid downhole in a wellbore; wherein the multiple buoyancy links are coupled together such that joints are formed between the multiple buoyancy links to allow movement between adjacent buoyancy links.

22. The system of claim 21, further comprising a flexible joint positioned behind the articulating buoyancy guidance sub and before the tubular string.

23. The system of claim 21, wherein the articulating buoyancy guidance sub is coupled to an end of the tubular string via at least one of an articulating joint or a flexible joint.

* * * * *